United States Patent
Shoda et al.

(10) Patent No.: US 7,054,040 B2
(45) Date of Patent: May 30, 2006

(54) IMAGE PROCESSING DEVICE AND METHOD FOR CONTROLLING THE SAME

(75) Inventors: Hirokazu Shoda, Yokohama (JP); Sunao Tabata, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 835 days.

(21) Appl. No.: 10/014,577

(22) Filed: Dec. 14, 2001

(65) Prior Publication Data

US 2003/0112475 A1 Jun. 19, 2003

(51) Int. Cl.
*H01N 1/04* (2006.01)
(52) U.S. Cl. .................. 358/474; 358/461; 358/471; 382/234; 382/304; 250/234; 359/197
(58) Field of Classification Search .............. 358/461, 358/500, 514, 474; 382/234, 304; 250/234; 359/197
See application file for complete search history.

(56) References Cited

U.S. PATENT DOCUMENTS 6,228,125 B1 * 5/2001 Kuriyama .................. 382/304

FOREIGN PATENT DOCUMENTS

JP A1 2001-77980 3/2001

* cited by examiner

*Primary Examiner*—Edward L. Coles
*Assistant Examiner*—Heather D Gibbs
(74) *Attorney, Agent, or Firm*—Foley & Lardner LLP

(57) ABSTRACT

First and second reading modules read first and second signals in the main scanning direction of the image of a document. The scanning module includes a carriage for relatively moving the first and second reading modules and the image of the document in a sub-scanning direction to make the modules scan the image. A scanning-control-condition selecting module selects scanning control conditions of the scanning module in accordance with a plurality of read magnifications preset as read magnifications of the document by the first and second reading modules. A first setting module sets the scanning control conditions to a plurality of control conditions in accordance with the read magnification of the first reading module. A second setting module sets the scanning control conditions to a plurality of control conditions in accordance with the read magnification of the second reading module. An operating module computes the image data at a corresponding read magnification through operations in accordance with the first and second signals read by the first and second reading modules at any one of the preset read magnifications when set to a read magnification other than the preset read magnifications.

24 Claims, 6 Drawing Sheets

P1 P2 P3 P4
Original image

Interpolated image

P1 P1' P2 P2' P3 P3' P4
Magnification-changed image
(200%)

f1 : Sampling frequency
f2 : Re-sampling frequency (Moving distance)
Magnification : 71%

IMAGE PROCESSING DEVICE AND METHOD FOR CONTROLLING THE SAME

BACKGROUND OF THE INVENTION

1. Field of the Invention

The present invention relates to an image-processing device and a method for controlling the device, particularly to an image-processing device and a method for controlling the device, using a method for changing magnifications in a sub-scanning-direction (carriage moving direction) when reading an image by conventionally changing carriage moving speeds and a method for changing magnifications in a sub-scanning direction through a combined operation in an image-forming device using a charge coupled device (CCD) as a photoelectric-conversion device for reading an image in a scanner section.

2. Description of the Related Art

As is publicly known, image-processing devices such as an electronic copying machine, digital copying machine (PPC), and facsimile use a CCD or the like by mounting it on a scanning carriage as a photoelectric-conversion device for reading an image in a scanner section.

Thus, in a optical system of a scanner section for reading image data by using a CCD or the like, the size (magnification) of a read image is decided by the number of pixels of a CCD used or the magnification of a lens used in the main scanning direction.

Therefore, a method is widely used which is performed by operating a digital signal obtained by A/D-converting an image signal read by a CCD as a technique for changing magnifications after reading.

In a sub-scanning direction (carriage moving direction), the following method is used: a method for changing magnifications by changing moving speeds of a carriage and thereby changing document widths to be read in one main scanning line or a method for changing magnifications through operations after reading the image data of one page.

However, in the case of the method for changing sub-scanning directions by changing moving speeds of a carriage, when a magnification ranges between 25 and 400%, a moving speed at 25%, 16 times larger than the moving speed at 400% is necessary when considering the moving speed of the carriage.

Moreover, when a CCD used is a four-line CCD capable of reading a monochrome signal and a color signal, the light-receiving sensitivity of a monochrome signal is different from that of a color signal.

Therefore, the carriage moving speed for reading a monochrome signal becomes different from the carriage moving speed for reading a color signal depending on the light-receiving sensitivity of each signal.

For example, when the difference between light-receiving sensitivities of a monochrome signal and a color signal is four times, a four-times speed difference occurs between the monochrome signal and the color signal for read at a magnification of 100%.

The difference is shown below by a specific value. That is, when the carriage moving speed at 100% of a monochrome signal is equal to 200 mm/sec, the carriage moving speed at 100% of a color signal becomes 50 mm/sec.

Similarly, the carriage scanning speed at 25% of a monochrome signal becomes 800 mm/sec.

Thus, it is necessary to change carriage-scanning speeds in a wide range of 64 times in accordance with the magnification-change rate of each of a monochrome signal and a color signal in the case of the above example.

To realize the above, it is necessary to select a motor which can be operated in the speed change range of 64 times as a motor for driving a carriage and take measures for vibrations effective throughout the whole speed range.

In this case, a problem occurs that the total cost of an image-forming device increases.

Moreover, in the case of a color CCD for reading RGB signals, an interval of several lines is physically produced between R and G and between G and B. Therefore, it is necessary to perform line correction as line alignment of RGB signals.

For example, when line intervals between RGB are respectively 8 lines, a memory for a delay of 16 lines is necessary for 100% read.

Moreover, to correspond to sub-scanning-directional enlargement in accordance with 25 to 40% of a magnification change by a carriage, a memory for a delay of 64 lines is necessary and moreover, a circuit for correcting one line or less is necessary.

These memory and circuit also cause a problem that the total cost of an image-forming device is increased.

To reduce vibrations in the whole speed range, the Jpn. Pat. Appln. Publication No. 77980/2001 discloses a system for changing magnifications in a sub-scanning direction by combining change of specific magnifications according to a carriage scanning speed with a reduction operation.

That is, this system changes only specific magnifications in a sub-scanning direction in accordance with a carriage scanning speed and changes magnifications with a reduction operation technique for a magnification (magnification designated by a user) not coinciding with the specific magnification.

However, because this system performs magnification change processing of all magnifications not coinciding with specific magnifications only by the reduction operation technique, image quality deterioration such as skip or moire of a thin line or diagonal line may occur when reducing a specific magnification from 200% to 101%.

BRIEF SUMMARY OF THE INVENTION

The present invention is made to solve the above problems and its object is to provide an image-processing device and a method for controlling the device capable of avoiding problems such as vibration, due to high-speed movement of a carriage, by combining a method for changing magnifications in a sub-scanning direction by conventionally changing scanning directions of a carrier with a method for changing magnifications in accordance with signal processing, reducing a circuit size for correction between lines of RGB signals and the number of memories for delay, suppressing image-quality deterioration in magnification change by adaptively changing enlargement and reduction, and effectively changing magnifications in a sub-scanning direction.

To achieve the above object, the first aspect of the present invention provides an image-processing device comprising:

a first reading module which reads a first signal in a main scanning direction of an image of a document;

a second reading module which reads a second signal in the main scanning direction of the image of the document;

a scanning module including a carriage which relatively moves the first and second reading modules and the image of the document to make the first and second modules scan the image of the document in its sub-scanning direction;

a scanning-control-condition selecting module which selects scanning control conditions of the scanning module in accordance with a plurality of read magnifications preset as read magnifications by the first and second reading modules to the document;

a first setting module which sets the scanning control conditions selected by the scanning-control-condition selecting module to a plurality of control conditions in accordance with a read magnification of the first reading module;

a second setting module which sets the scanning control conditions selected by the scanning-control-condition selecting module to a plurality of control conditions in accordance with a read magnification of the second reading module; and an operating module which computes the image data at a corresponding read magnification in accordance with the first and second signals read by the first and second reading modules at any one of the preset read magnifications when set to a read magnification other than the preset read magnifications.

According to a first aspect of the present invention, it is possible to realize measures for vibrations with an inexpensive component by restricting a scanning control point because of executing a control condition for making a carriage perform scanning by a scanning module at only a preset magnification.

Moreover, in the case of the invention of the first aspect, when using a four-line CCD having a monochrome sensor serving as a first reading module and a RGB sensor serving as a second reading sensor, only specific magnifications (100%, 200%, and 400%) are changed in a sub-scanning direction by scanning the scanning speed of a carriage and combining the magnification change according to a carriage scanning direction with the magnification change according to an operation for magnifications other than the above magnifications in reading an image by a monochrome sensor and reading an image by a RGB sensor.

Furthermore, a second aspect of the present invention provides the image-processing device according to the first aspect, in which the operating module is provided with first and second operating modules which compute the image data values at a corresponding read magnification through enlargement and reduction operations in accordance with the first and second signals read by the first and second reading modules at any one of the above preset read magnifications when set to a read magnification other than the above preset read magnifications and a changing module for adaptively changing the first and second operating modules in accordance with a set read magnification.

According to the second aspect of the present invention, it is possible to prevent image quality deterioration such as skip or moire of a thin line or diagonal line because of computing a magnification-changed image by adaptively changing enlargement and reduction operations about magnifications other than a magnification obtained through carriage scanning when using a four-line CCD having a monochrome sensor serving as a first reading module and a RGB sensor serving as a second reading module.

Moreover, in the case of the invention of the second aspect, the following two types of magnification-change-image generation are considered when a magnification designated by a user is set to 141%.

(1) A designated magnification of 141% is obtained by combining a carriage scanning speed of 100% with an operation (enlargement).

(2) A designated magnification of 141% is obtained by combining a carriage scanning speed of 200% with an operation (reduction).

Then, the second aspect of the present invention changes these two types of magnification-change-image generation in accordance with a predetermined condition (threshold-value determination).

Furthermore, a third aspect of the present invention provides the image-processing device according to the first aspect, in which the first and second setting modules set the scanning control conditions in accordance with light-receiving-sensitivity ratios of the first and second reading modules.

In the case of the invention of the third aspect, when using a four-line CCD having a monochrome sensor serving as a first reading module and a RGB sensor serving as a second reading module, the condition of a carriage scanning speed is decided in accordance with the ratio between the monochrome sensitivity of the first reading module and the color sensitivity of the second reading module.

Furthermore, a fourth aspect of the present invention provides the image-processing device according to the first aspect, in which the first and second setting modules set the scanning conditions to a specific magnification and magnifications upper and lower than the specific magnification in order to prevent vibrations caused by the carriage scan.

According to the invention of the fourth aspect, the magnification change according to a carriage scanning speed includes not only pin-point magnifications of 100%, 200%, and 400% but also ranges of several percents (e.g. 99–101%, 199–201%, and 399–401%) (e.g. 99–101%, 199–201%, and 399–401%) upper and lower than the pin-point magnifications.

To achieve the above object, a fifth aspect of the present invention provides an image-processing device comprising:

a first reading module which reads a monochrome signal in a main scanning direction of an image of a document;

a second reading module which reads a color signal in the main scanning direction of the image of the document;

a correcting module which aligns color signals read by the second reading module every line;

a scanning module including a carriage which relatively moves the first and second reading modules and the image of the document to make the first and second reading modules scan the image of the document in its sub-scanning direction;

a scan-control-condition selecting module which selects scan-control conditions of the scanning module in accordance with a plurality of read magnifications preset as read magnifications of the document by the first and second reading modules;

a setting module which sets the scanning control conditions selected by the scan-control-condition selecting module to a plurality of control conditions in accordance with the correction of the color signals to be corrected by the correcting module every line; and an operating module which computes the image data of a corresponding read magnification through operations in accordance with the first and second signals read by the first and second reading modules at any one of the preset read magnifications when set to a read magnification other than the preset read magnifications.

According to the invention of the fifth aspect, it is possible to reduce the number of delay memories and simplify inter-line correction by setting sub-scanning enlargement by a carriage to several points which are integral multiples of 100% because of setting the scanning condition of the carriage in accordance with line correction when using a four-line CCD having a monochrome sensor serving as a first reading module and a RGB sensor serving as a second reading module.

Moreover, in the case of the invention of a sixth aspect, to simplify the inter-line correction, a changing magnification by a carriage is set to 100%, 2n times of 100%, or 1/2n times of 100% such as 25%, 50%, 200%, or 400% (in this case, n is an integer).

To achieve the above object, the sixth aspect of the present invention provides an image-processing device comprising:

a reading module which reads color signals in a main scanning direction of an image of the document;

a correcting module which aligns the color signals read by the reading module every line;

a scanning module including a carriage which relatively moves the reading module and the image of the document to make the reading module scans the image of the document in its sub-scanning direction;

a scan-control-condition selecting module which selects scan-control conditions of the scanning module in accordance with a plurality of read magnifications preset as read magnifications of the document by the reading module;

a setting module which sets the scanning control conditions selected by the scanning-control-condition selecting module to a plurality of control conditions in accordance with the correction of color signals to be corrected by the correcting module every line; and an operating module which computes the image data of a corresponding read magnification through operations in accordance with the color signals read by the reading module at any one of the preset read magnifications when set to a read magnification other than the preset read magnifications.

According to the invention of the sixth aspect, because the scanning condition of a carriage is set in accordance with line correction by using a RGB three-line sensor as a reading module for reading a color signal, it is possible to reduce the number of delay memories and simplify inter-line correction by setting sub-scanning enlargement by a carriage to several points which are integral multiples of 100%.

Moreover, in the case of the invention of the sixth aspect, to simplify inter-line correction, a changing magnification by a carriage is set to 2n times or n/2 times such as 25%, 50%, 100%, 200%, or 400%.

To achieve the above object, a seventh aspect of the present invention provides an image-processing device comprising:

a reading module which reads signals in a main scanning direction of an image of the document;

a scanning module including a carriage for relatively moves the reading module and the image of the document to make the reading module scan the image of the document in its sub-scanning direction;

a scanning-control-condition selecting module which selects scanning-control conditions of the scanning module in accordance with a plurality of read magnifications preset as read magnifications of the document by the reading module;

a setting module which sets the scanning control conditions selected by the scanning-control-condition selecting module to a plurality of control conditions in accordance with read magnifications of the reading module;

a first operating module which computes the image data at a corresponding read magnification through enlargement operation in accordance with the signal read by the reading module at any one of the preset read magnifications when set to a read magnification other than the preset read magnifications;

a second operating module which computes the image data at a corresponding read magnification through reduction operation in accordance with the signal read by the reading module at any one of the preset read magnifications when set to a read magnification other than the preset read magnifications; and a changing module which adaptively changes the first and second operating modules in accordance with a set read magnification.

According to the invention of the seventh aspect, it is possible to prevent image-quality deterioration such as skip or moire of a thin line or diagonal line because a magnification-changed image is computed by adaptively changing enlargement operation and reduction operation about magnifications other than those obtained through carriage scanning when using a RGB three-line sensor as a reading module.

In the case of the invention of the seventh aspect, the following two types of magnification-change-image generation are considered when setting a magnification designated by a user to 141%.

(1) A designated magnification of 141% is obtained by combining a carriage scanning speed of 100% with an operation (enlargement).

(2) A designated magnification of 141% is obtained by combining a carriage scanning speed of 200% with an operation (reduction).

Moreover, the invention of the seventh aspect changes two types of magnification-change-image generation in accordance with a predetermined condition (threshold-value determination).

Furthermore, an eighth aspect of the present invention provides the image-processing device according to the seventh aspect, in which the setting module sets the scanning-control conditions to a specific magnification and magnifications upper and lower than the specific magnification in order to prevent vibrations caused by the carriage scanning.

According to the invention of the eighth aspect, magnification-change magnifications according to a carriage scanning speed include not only pin-point magnifications of 100%, 200%, and 400% but also ranges of several percents (e.g. 99–101%, 199–201%, and 399–401%) higher and lower the pin-point magnifications when using a RGB three-line sensor as a reading module.

To achieve above object, a ninth aspect of the present invention provides an image-processing device comprising:

first reading means for reading first signals in a main scanning direction of an image of a document;

second reading means for reading second signals in the main scanning direction of the image of the document;

scanning means including a carriage for relatively moving the first and second means and the image of the document to make the first and second reading means scan the image in its sub-scanning direction;

scanning-control-condition selection means for selecting scanning control conditions of the scanning means in accordance with a plurality of read magnifications preset as read magnifications of the document by the first and second reading means;

first setting means for setting the scanning control conditions selected by the scanning-control-condition selection means to a plurality of control conditions in accordance with the read magnification of the first reading means;

second setting means for setting the scanning control conditions selected by the scanning-control-condition selection means to a plurality of control conditions in accordance with the read magnification of the second reading means; and operation means for computing the image data of a corresponding read magnification in accordance with the first and second signals read by the first and second reading means at any one of the preset read magnifications.

According to the invention of the ninth aspect, it is possible to realize vibration measures with inexpensive components by restricting scanning points because of executing control conditions for moving a carriage to make the carriage perform scanning only at a preset magnification by scanning means.

Moreover, in the case of the invention of the ninth aspect, when using a four-line CCD having a monochrome sensor serving as first reading means and a RGB sensor serving as second reading means, magnifications are changed in a sub-scanning direction by scanning the scanning speed of a carriage at only specific magnifications (100%, 200%, and 400%) and combining the magnification change according to a carriage scanning direction with the magnification change according to an operation for magnifications other than the above magnifications in reading an image by a monochrome sensor and reading an image by a RGB sensor.

Furthermore, a tenth aspect of the present invention provides the image-processing device according to the ninth aspect, in which the operation means is provided with first and second operation means for computing the image data at a corresponding read magnification through enlargement operation and reduction operation in accordance with the first and second signals read by the first and second reading means at any one of the preset read magnifications when set to a read magnification other than the preset read magnifications and change means for adaptively changing the first and second operation means in accordance with a set read magnification.

According to the invention of the tenth aspect, it is possible to prevent image-quality deterioration such as skip or moire of a thin line or diagonal line because of computing a magnification-changed image by adaptively changing enlargement operation and reduction operation for magnifications other than magnifications obtained through carriage scanning when using a four-line CCD having a monochrome sensor serving as first reading means and a RGB sensor serving as second reading means.

Moreover, in the case of the invention of the tenth aspect, the following two types of magnification-change-image generation are considered when setting a magnification designated by a user to 141%.

(1) A designated magnification of 141% is obtained by combining a carriage scanning speed of 100% with an operation (enlargement).

(2) A designated magnification of 141% is obtained by combining a carriage scanning speed of 200% with an operation (reduction).

Then, the invention of the tenth aspect changes these two types of magnification-change-image generation in accordance with a predetermined condition (threshold-value determination).

Furthermore, an eleventh aspect of the present invention provides the image-processing device according to the ninth aspect, in which the first and second setting means set the scanning control conditions in accordance with light-receiving sensitivities of the first and second reading means.

In the case of the invention of the eleventh aspect, the condition of a carriage scanning speed is decided in accordance with the ratio between the monochrome sensitivity of the first reading means and the color sensitivity of the second reading means when using a four-line CCD having a monochrome sensor serving as first reading means and a RGB sensor serving as second reading means.

Furthermore, a twelfth aspect of the present invention provides the image-processing device according to the ninth aspect, in which the first and second setting means set the scanning control conditions to a specific magnification and magnifications upper and lower than the specific magnification in order to prevent vibrations caused by the carriage scanning.

According to the invention of the twelfth aspect, magnification-change magnifications according to a carriage scanning speed include not only pin-point magnifications of 100%, 200%, and 400% but also ranges of several percents (e.g. 99–101%, 199–201%, and 399–401%) upper and lower than the pin-point magnifications when using a four-line CCD having a monochrome sensor serving as first reading means and a RGB sensor serving as second reading means.

To achieve the above object, a thirteenth aspect of the present invention provides an image-processing device comprising:

first reading means for reading monochrome signals in a main scanning direction of an image of a document;

second reading means for reading color signals in the main scanning direction of the image of the document;

correction means for aligning color signals read by the second reading means every line;

scanning means including a carriage for relatively moving the first and second reading means and the image of the document to make the means scan the image in its sub-scanning direction;

scanning-control-condition selection means for selecting scanning control conditions of the scanning means in accordance with a plurality of read magnifications of the document preset as read magnifications by the first and second reading means;

setting means for setting the scanning control conditions selected by the scanning-control-condition selection means to a plurality of control conditions in accordance with the correction of color signals to be corrected by the correction means every line; and operation means for computing the image data at a correspond read magnification through operations in accordance with the first and second signals read by the first and second reading means at any one of the preset read magnifications when set to a read magnification other than the preset read magnifications.

According to the invention of the thirteenth aspect, it is possible to reduce the number of delay memories and simplify inter-line correction by setting the sub-scanning enlargement by a carriage to several points which are integral multiples of 100% because of setting a carriage scanning conditions in accordance with line correction when using a four-line CCD having a monochrome sensor serving as first reading means and a RGB sensor serving as second reading means.

Furthermore, in the case of the invention of the thirteenth aspect, a changing magnification by a carriage is set to 2n times or n/2 times such as 25%, 50%, 100%, 200%, or 400%.

To achieve the above object, a fourteenth aspect of the present invention provides an image-processing device comprising:

reading means for reading color signals in a main scanning direction of an image of a document;

correction means for aligning the color signals read by the reading means every line;

scanning means including a carriage for relatively moving the reading means and the image of the document to make the reading means scans the image in its sub-scanning direction;

scanning-control-condition selection means for selecting scanning control conditions of the scanning means in accordance with a plurality of read magnifications preset as read magnifications of the document by the reading means;

setting means for setting the scanning control conditions selected by the scanning-control-condition selection means to a plurality of control conditions in accordance with the correction of the color signals to be corrected by the correction means every line; and operation means for computing the image data at a corresponding read magnification through operations in accordance with the color signals read by the reading means at any one of the preset read magnifications when set to a read magnification other than the preset read magnifications.

According to the invention of the fourteenth aspect, it is possible to reduce the number of delay memories and simplify inter-line correction by setting the sub-scanning enlargement by a carriage to several points which are integral multiples of 100% because of setting the scanning condition of the carriage in accordance with line correction by using a RGB three-line sensor as reading means for reading a color signal.

Furthermore, in the case of the invention of the fourteenth aspect, to simplify inter-line correction, a changing magnification by a carriage is set to 2n time or n/2 time such as 25%, 50%, 100%, or 400%.

To achieve the above object, a fifteenth aspect of the present invention provides an image-processing device comprising:

reading means for reading signals in a main scanning direction of an image of a document;

scanning means including a carriage for relatively moving the reading means and the image of the document to make the reading means scans the image in its sub-scanning direction;

scanning-control-condition selection means for selecting scanning control conditions of the scanning means in accordance with a plurality of read magnifications of the document preset by the reading means as read magnifications;

setting means for setting the scanning control conditions selected by the scanning-control-condition selection means to a plurality of control conditions in accordance with the read magnification of the reading means;

first operation means for computing the image data at a corresponding read magnification through enlargement operation in accordance with the signals read by the reading means at any one of the preset read magnifications when set to a read magnification other than the preset read magnifications;

second operation means for computing the image data at a corresponding read magnification through reduction operation in accordance with the signals read by the reading means at any one of the preset read magnifications when set to a read magnification other than the preset read magnifications; and change means for adaptively changing the first and second operation means in accordance with a set read magnification.

According to the invention of the fifteenth aspect, it is possible to prevent image-quality deterioration such as skip or moire of a thin line or diagonal line because of computing a magnification-changed image by adaptively changing enlargement and reduction at a magnification other than the magnification obtained through carriage scanning when using a RGB three-line sensor as reading means.

Moreover, in the case of the invention of the fifteenth aspect, the following two types of magnification-change-image generation are considered to set a magnification designated by a user to 141%.

(1) A designated magnification of 141% is obtained by combining a carriage scanning speed of 100% with an operation (enlargement).

(2) A designated magnification of 141% is obtained by combining a carriage scanning speed of 200% with an operation (reduction).

Then, the invention of the fifteenth aspect changes these two types of magnification-change-image generation in accordance with a predetermined condition (threshold-value determination).

Moreover, a sixteenth aspect of the present invention provides the image-processing device according to the fifteenth aspect, in which the setting means sets the scanning control conditions to a specific magnification and magnifications upper and lower the specific magnification in order to prevent vibrations caused by the carriage scanning.

According to the invention of the sixteenth aspect, magnification-change magnifications according to carriage scanning speeds include not only pin-point magnifications of 100%, 200%, and 400% but also ranges of several percents (e.g. 99–101%, 199–201%, and 399–401%) upper and lower than the pin-point magnifications.

To achieve the above object, a seventeenth aspect of the present invention provides a method for controlling an image-processing device provided with scanning means including a carriage which relatively moves first and second reading means for reading first and second signals and an image of a document in a main scanning direction of the image to make the first and second reading means scan the image in its sub-scanning direction, comprising:

selecting scanning control conditions of the scanning means in accordance with a plurality of read magnifications preset as read magnifications of the document by the first and second reading means;

setting the scanning control conditions to a plurality of control conditions in accordance with the read magnification of the first reading means;

setting the scanning control conditions to a plurality of control conditions in accordance with the read magnification of the second reading means; and computing the image data through operations at a corresponding read magnification in accordance with the first and second signals read by the first and second reading means at any one of the preset read magnifications when set to a read magnification other than the preset read magnifications.

To achieve the above object, an eighteenth aspect of the present invention provides a method for controlling an image-processing device provided with scanning means including a carriage which relatively moves first and second reading means for reading monochrome and color signals and an image of a document in a main scanning direction of the image to make the first and second reading means scan the image in its sub-scanning direction, comprising:

aligning color signals read by the second reading means every line;

selecting scanning control conditions of the scanning means in accordance with a plurality of read magnifications preset as read magnifications of the document by the first and second reading means;

setting the scanning control conditions to a plurality of control conditions in accordance with alignment of the color signals every line; and computing the image data at a corresponding read magnification in accordance with the monochrome and color signals red by the first and second reading means at any one of the preset read magnifications when set to a read magnification other than the preset read magnifications.

To achieve the above object, a nineteenth aspect of the present invention provides a method for controlling an image-processing device provided with scanning means including a carriage which relatively moves reading means for reading color signals and an image of a document in a main scanning direction of the image to make the reading means scans the image in its sub-scanning direction, comprising:

aligning color signals read by the reading means every line;

selecting scanning control conditions of the scanning means in accordance with a plurality of read magnifications preset as read magnifications of the document by the reading means;

setting the scanning control conditions to a plurality of control conditions in accordance with the alignment of the color signals every line; and computing the image data at a corresponding read magnification in accordance with the color signals read by the reading means at any one of the preset read magnifications when set to a read magnification other than the preset read magnifications.

To achieve the above object, the twentieth aspect of the present invention provides a method for controlling an image-processing device provided with scanning means including a carriage which relatively moves reading means for reading signals and an image of a document in a main scanning direction of the image to make the reading means scans the image in its sub-scanning direction, comprising:

selecting scanning control conditions of the scanning means in accordance with a plurality of read magnifications preset as read magnifications of the document by the reading means;

setting the scanning control conditions to a plurality of control conditions in accordance with the read magnification of the reading means;

computing the image data at a corresponding read magnification through enlargement operation in accordance with the signals read by the reading means at any one of the preset read magnifications when set to a read magnification other than the preset read magnifications;

computing the image data at a corresponding read magnification through reduction operation in accordance with the signals read by the reading means at any one of the preset read magnifications when set to a read magnification other than the preset read magnifications; and adaptively changing the enlargement operation and the reduction operation in accordance with a set read magnification.)

(Corresponding Embodiment)

In the above first to twentieth aspects of the present invention, the first to fourth, ninth to thirteenth, and seventeenth aspects correspond to a first embodiment to be described later.

Moreover, the fifth to eighth, fourteenth to sixteenth, and eighteenth to twentieth aspects correspond to a second embodiment to be described later.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiment given below, serve to explain the principles of the present invention.

DETAILED DESCRIPTION OF THE INVENTION

Figure 1:
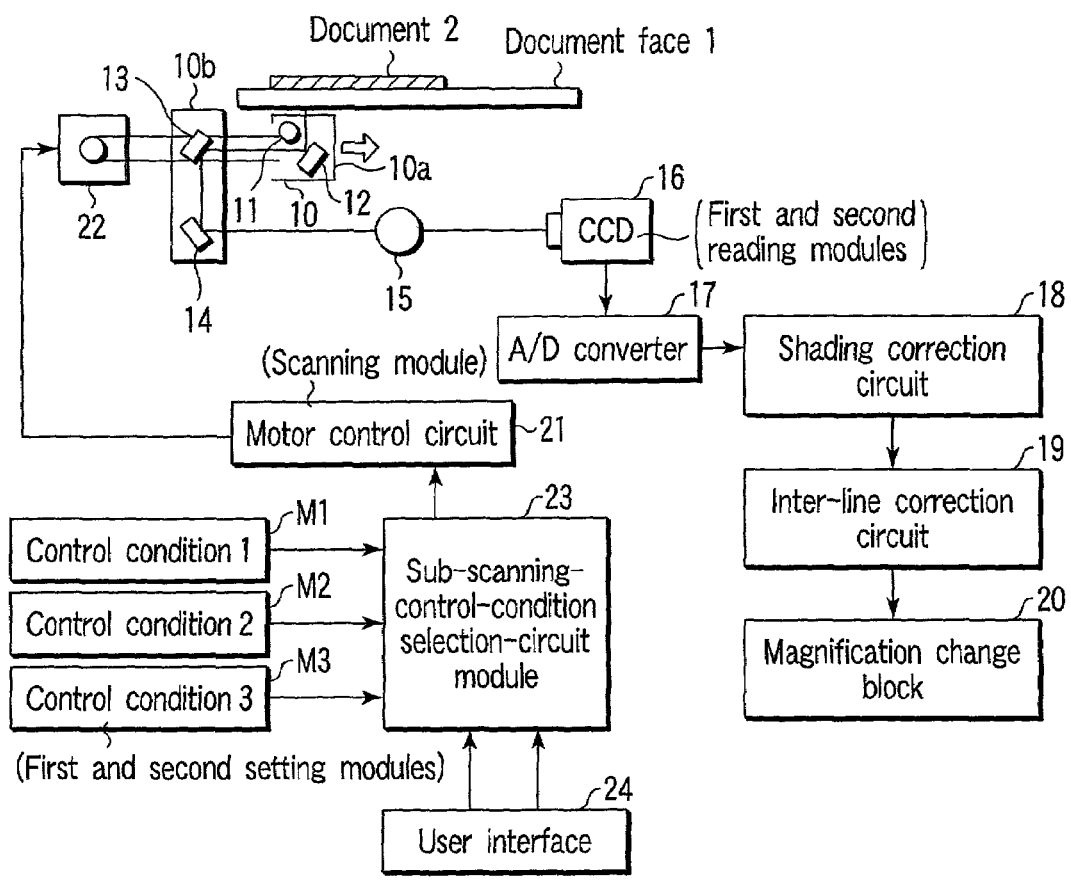
FIG. 1 is a block diagram showing a conceptual configuration of a reader (scanner) to be applied as the image-processing device of the first embodiment of the present invention.

Reference will now be made in detail to the presently preferred embodiments of the invention as illustrated in the accompanying drawings, in which like reference numerals designate like or corresponding parts.

Embodiments of the present invention are described below by referring to the accompanying drawings.

(First Embodiment)

FIG. 1 is a block diagram showing a configuration of a reader (scanner) to be applied as the image-processing device of a first embodiment of the present invention.

As shown in FIG. 1, the scanner reads a document image by directly applying light to a document 2 put on a document-mounting face 1 by an exposure lamp 11 set to a first scanning carriage 10a and guiding optical images formed by the reflected light up to a CCD 16 through a reading optical system including a mirror 12 set to the first scanning carriage 10a, mirrors 13 and 14 set to a second scanning carriage 10b, and an imaging lens 15 set in the device body.

In this case, the first scanning carriage 10a, as described later, is moved by a driving force supplied from a motor 22 controlled by a motor control circuit 21 to make the mirror 12 of the reading optical system set to the first scanning carriage 10a scan a document in its sub-scanning direction shown by an arrow.

Moreover, the CCD 16 constitutes a first reading module for reading a first signal in the main scanning direction of the image of a document 2 and a second reading module for reading a second signal in the main scanning direction of the image of the document 2 together with the reading optical system.

Figure 2:
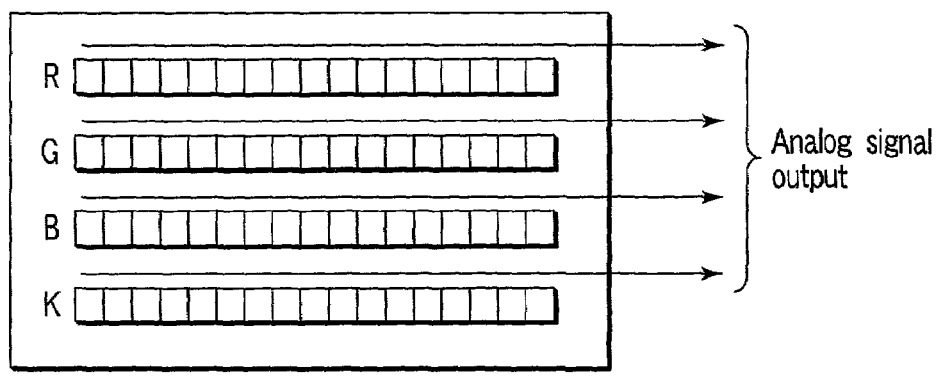
FIG. 2 is a conceptual illustration showing a four-line CCD used for the first embodiment of the present invention.

Specifically, as shown in FIG. 2, the CCD 16 is constituted by a four-line sensor for separately reading a K signal (monochrome signal) serving as the first signal and a RGB (color) signal serving as the second signal.

Moreover, the motor control circuit 21 constitutes a scanning module including a carriage for relatively moving the first and second reading modules and the image of a document to make the means scan the image in its sub-scanning direction.

Then, the optical images guided to the CCD 16 are photoelectrically converted every K signal and RGB signals and thereby, replaced with electric-charge signals for each of a plurality of light-receiving elements (e.g. 7,500 elements in the case of 600 dpi).

The electric-charge signals output from the CCD 16 as analog signals are converted into digital image signals by an A/D (analog/digital) converter 17.

The digital image signals output from the A/D converter 17 are shading-corrected by a shading-correction circuit 18 and then, inter-line-corrected by an inter-line correction circuit 19 as described later.

The inter-line correction circuit 19 constitutes a correcting module for aligning color signals read by the second reading module every line.

Moreover, image signals inter-line-corrected by the inter-line correction circuit 19 are supplied to a magnification-change block 20 as image signals magnification-changed in accordance with a carriage moving speed and variable-power-processed through the operations to be described later.

Then, the flow of a magnification change according to a carriage moving speed is described below.

The motor control circuit 21 is a circuit constituting the above correcting module for controlling a speed for making the mirror 12 set to the scanning carriage 10a scan the document 2 in its sub-scanning direction.

The motor control circuit 21 changes scanning speeds of the mirror 12 connected to the motor 22 by controlling the number of revolutions of the motor 22.

A sub-scanning-control-condition determination circuit 23 selects a parameter serving as a sub-scanning condition for controlling the number of revolutions of a motor in accordance with a plurality of preset magnifications and supplies the parameter to the motor control circuit 21.

The sub-scanning-control-condition determination circuit 23 constitutes a scanning-control-condition selecting module for selecting scanning-control conditions of the scanning module in accordance with a plurality of read magnifications preset as read magnifications of the document 2 by the first and second reading modules.

In this case, the parameter of a magnification-change magnification serving as a sub-scanning-control condition preset in the sub-scanning-control-condition determination circuit 23 is set as a parameter corresponding to the monochrome/color light-receiving sensitivity ratio between a K signal and a RGB signal by the CCD 16 constituted by four line sensors.

For example, sub-scanning-control conditions are set to magnifications of monochrome 100% as a control condition 1, monochrome 200% as a control condition 2, and monochrome 400% as a control condition 3.

Parameters of monochrome 100% as the control condition 1, monochrome 200% as the control condition 2, and monochrome 400% as the control condition 3 are stored in memories M1, M2, and M3 one each.

In this case, when the monochrome/color sensitivity ratio by the CCD 16 is 2:1, the magnification change according to a carriage scanning speed under color read becomes 50%, 100%, or 200% and the carriage scanning speed becomes 200 m/s, 100 m/s, or 50 m/s for a monochrome read magnification-change magnification of 100%, 200%, or 400%.

The magnification change according to a carriage scanning speed under color read becomes 50%, 100%, or 200% for a monochrome read magnification-change magnification of 100%, 200%, or 400% and parameters of carriage scanning speeds of 200 m/s, 100 m/s, and 50 m/s are stored in the memories M1, M2, and M3 one each.

In this case, these memories M1, M2, and M3 constitute a first setting module for setting the scanning-control conditions selected by the scanning-control-condition selecting module to a plurality of control conditions in accordance with the read magnification of the first reading module and a second setting module for setting the scanning-control conditions selected by the scanning-control-condition selecting module to a plurality of control conditions in accordance with the read magnification of the second reading module.

Thus, in the case of this embodiment, because the speed range of a carriage is narrowed by changing magnifications in a sub-scanning direction only in accordance with a plurality of limited magnifications, it is possible to use an inexpensive motor as a motor for scanning a carriage and reduce the cost of measures for vibrations caused by the carriage. Therefore, it is possible to prevent the total cost of an image-processing device from increasing.

Then, the motor control circuit 21 compares a magnification-change magnification with a carriage-scanning-determination threshold value by using a designated magnification input from a user interface 24 to decide the scanning speed of the carriage 10a in accordance with magnitudes of these values.

A scanning-speed-determination conditional formula for the carriage 10a is described below.

First, when the conditional formula meets the expression of sub-scanning-control condition $1 \leq$ designated magnification<carriage-scanning-determination threshold value<sub-scanning-control condition 2, the carriage scanning speed becomes equal to the sub-scanning-control condition 1.

When the conditional formula meets the expression of sub-scanning-control condition 1<carriage-scanning-determination threshold value≦sub-scanning-control condition 2, the carriage-scanning speed becomes equal to the sub-scanning-control condition 2.

However, when the designated magnification input from the user interface 24 is larger or smaller than the magnification in a sub-scanning-control condition preset to the sub-scanning-control-condition determination circuit 23 with a plurality of values, a carriage scanning speed is decided with the maximum or minimum magnification of the sub-scanning-control condition.

For example, when the designated magnification of a monochrome image is 141%, either of the sub-scanning-control condition 1 of 100% and the sub-scanning-control condition 2 of 200% is selected.

In this case, when performing the above determination by setting a carriage-speed-determination threshold value to 130%, the expression of 100%<130%(threshold value) <141%(designated magnification)<200% is effectuated. Therefore, 200% of the control condition 2 is selected as a sub-scanning control condition.

Moreover, when the set value of the magnification-change magnification (designated magnification) of a color image is 300%, the expression of maximum sub-scanning-control-condition value (200%)<300% (designated magnification) is effectuated. Therefore, the control condition 2 of 200% is selected as a sub-scanning-control condition.

Then, a flow of a magnification change through operations for a sub-scanning magnification-changed image according to a carriage moving speed is described below.

Figures 3, 4:
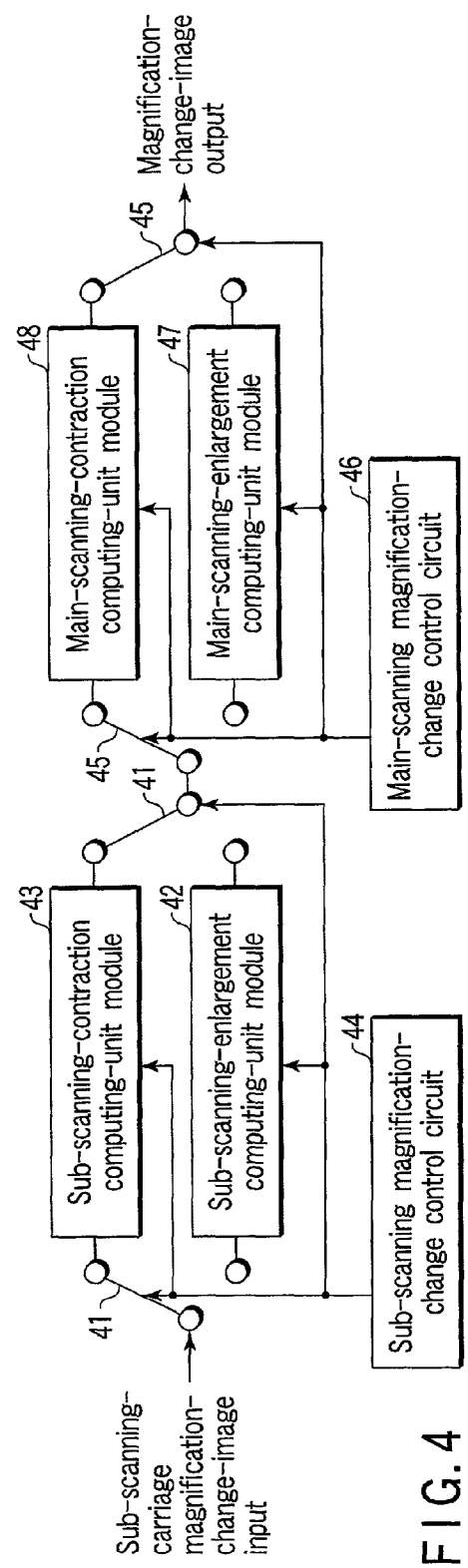
FIG. 3 is a conceptual illustration showing the relation between monochrome-signal reading speed and color-signal reading speed by a four-line CCD used for the first embodiment of the present invention.
FIG. 4 is a conceptual illustration showing a detailed configuration of a magnification-change block for executing a magnification change through operations by the image-processing device of the first embodiment of the present invention.

FIG. 4 is an illustration showing a detailed configuration of the magnification-change block 20 in FIG. 1.

The magnification-change block 20 constitutes an operating module for computing the image data at a corresponding read magnification through operations in accordance with the first and second signals read by the first and second reading modules at any one of the preset read magnifications when a designated magnification input from the user interface 24 is set to a read magnification other than the preset read magnifications.

That is, when a K (monochrome) signal or a RGB (color) signal output from the CCD 16 constituted by a four-line sensor is input to the magnification-changing block 20 as a sub-scanning magnification-changed image according to the above carriage moving speed, the sub-scanning-directional magnification-change method is decided by a switch 41.

In this case, the sub-scanning-directional magnification change uses a sub-scanning-enlargement computing-unit module 42 and a processing-block sub-scanning-reduction computing unit 43 for performing sub-scanning-control reduction.

In this case, the sub-scanning-enlargement computing-unit module 42 generates an image at a designated magnification through the linear-interpolation operation.

Figure 5A:
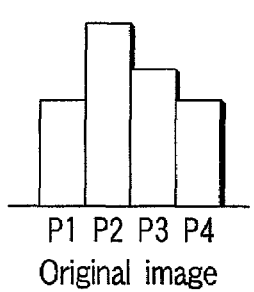
FIGS. 5A to 5C are conceptual illustrations showing the magnification change through the linear interpolation to be executed by the image-processing device of the first embodiment of the present invention.
Figure 5B:
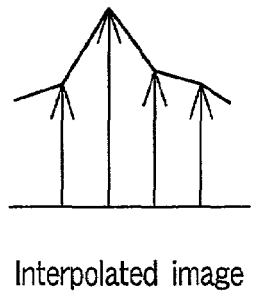
Figure 5C:
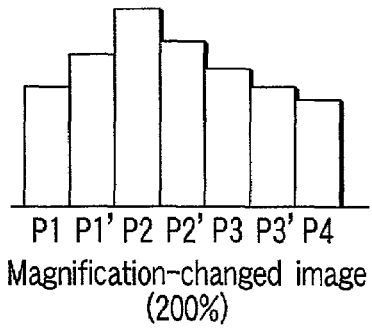

Specifically, the sub-scanning-enlargement computing-unit module 42 computes the interpolation pixel P1' shown in FIGS. 5B and 5C in accordance with original images P1 and P2 in accordance with the following expression in order to enlarge the image signal shown in FIG. 5A to 200%.

$$P1'=(1-0.5) \times P1+0.5 \times P2$$

By generalizing the above expression, the following expression is obtained.

$$P1'=(1-a) \times P1+a \times P2$$

In the above expression,
a=100/magnification-change rate

Moreover, the sub-scanning-reduction computing-unit module 43 generates a designated image through the projection method.

Figure 6:
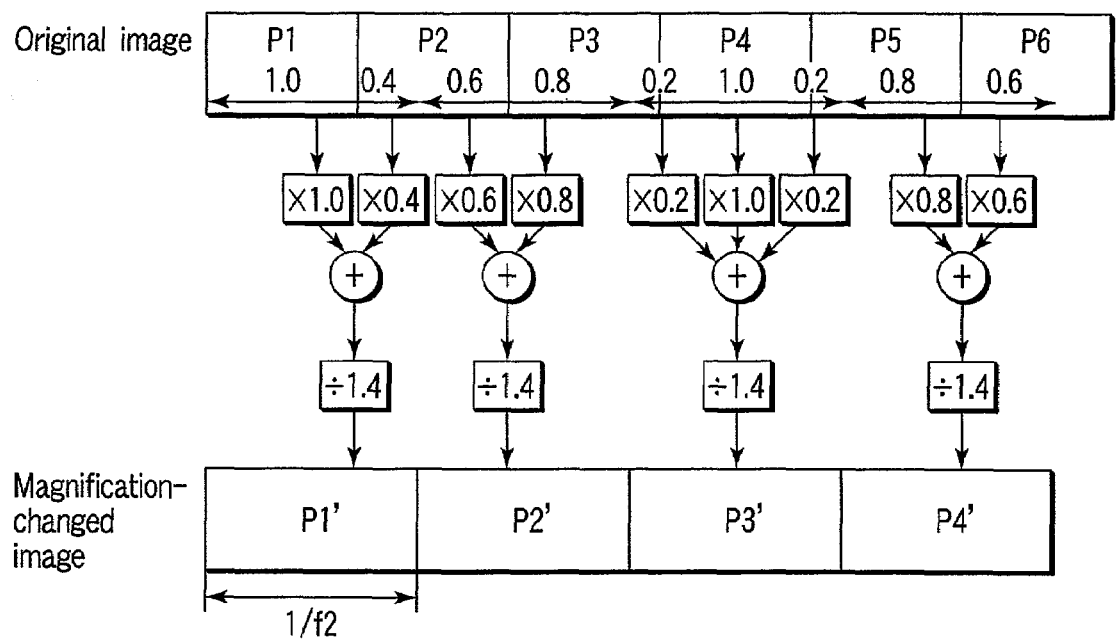
FIG. 6 is a conceptual illustration showing the magnification change through the projective method to be executed by the image-processing device of the first embodiment of the present invention.

Specifically, when contracting an original image having an image signal P1–P6 shown in FIG. 6 to 71% by the sub-scanning-reduction computing-unit module 43, the number of reference pixels of the original image becomes 2 or 3 and the head magnification-change pixel P1' is obtained by the following expression in accordance with P1 and P2.

$$P1'=(1.0 \times P1+0.4 \times P2)/1.4$$

Moreover, a magnification-change pixel P3' is obtained by the following expression in accordance with P3, P4, and P5.

$$P3'=(0.2 \times P3+1.0 \times P4+0.2 \times P5)/4$$

The switch 41 shown in FIG. 4 selects a sub-scanning magnification-change method in accordance with the processing-method information output from a sub-scanning-magnification determination circuit 44.

In this case, the sub-scanning-magnification determination circuit 44 determines whether to perform the sub-scanning magnification change through operations in accordance with the enlargement method or reduction method in accordance with the determination information for monochrome signal or color signal, a magnification-change magnification (designated magnification) set value set by the user interface 24, and carriage-magnification-change-magnification information (magnification of carriage scanning).

For example, when an image read by a four-line CCD is a monochrome image, a magnification designated by the user interface 24 is 141%, and a carriage magnification-change magnification is 200%, the sub-scanning-magnification determination circuit 44 selects the sub-scanning reduction block 43 and sets the reduction magnification to 70.5%.

Then, the sub-scanning magnification-changed image undergoes main-scanning magnification change.

In this case, a switch 45 selects a main-scanning-enlargement computing-unit module 47 or a main-scanning-reduction computing-unit module 48 in accordance with the determination information output from a main-scanning-magnification determination circuit 46.

In this case, the main-scanning-enlargement computing-unit module 47 generates a magnification-changed image by using the linear interpolation similarly to the case of the sub-scanning-enlargement computing-unit module 42.

Moreover, the main-scanning-reduction computing-unit module 48 generates a reduction image by using the projection method similarly to the case of the sub-scanning-enlargement(sic) computing-unit module 43.

In this case, the main-scanning-magnification determination circuit 46 selects enlargement and reduction in accordance with a magnification-change magnification set by the user interface 24 and sets a processing magnification to the main-scanning enlargement or main-scanning reduction.

Main-scanning magnification change is described below by using the above example. Because the magnification set by the user interface 24 is 141%, enlargement is selected and 141% is set as an enlargement magnification.

Thus, in the case of this embodiment, it is possible to narrow a carriage-scanning-speed range by using the sub-scanning magnification change in which the magnification change according to a carriage is combined with the magnification change according to an operation and decrease the whole cost of an image-processing device because the cost for measures of vibrations generated in the carriage can be decreased by limiting a carriage speed.

Moreover, because this embodiment uses a method capable of selecting a case of changing magnifications through enlargement or a case of changing magnifications through reduction in accordance with a condition, it is possible to suppress the skip of a thin line or diagonal line which has been caused by changing magnifications only through reduction in the prior art and perform desired magnification change while maintaining the image quality.

Although carriage-scanning magnifications are set to three levels of 100%, 200%, and 400% in the case of the above embodiment, other ranges, such as 99–101%, 199–201%, and 399–401% for the carriage-scanning magnifications are also possible.

Moreover, in the case of the above embodiment, magnification change is performed through an operation in accordance with a RGB signal or monochrome signal (signal read by a CCD). However other signals, such as a CMYK signal may be used.

Furthermore, although enlargement is performed through linear interpolation in the above embodiment, other enlargement methods may be used.

Furthermore, although reduction is performed in accordance with the projection method in the above embodiment, another reduction method may be used.

(Second Embodiment)

Next, the second embodiment of the present invention will be described below by referring to the accompanying drawings.

Figure 7:
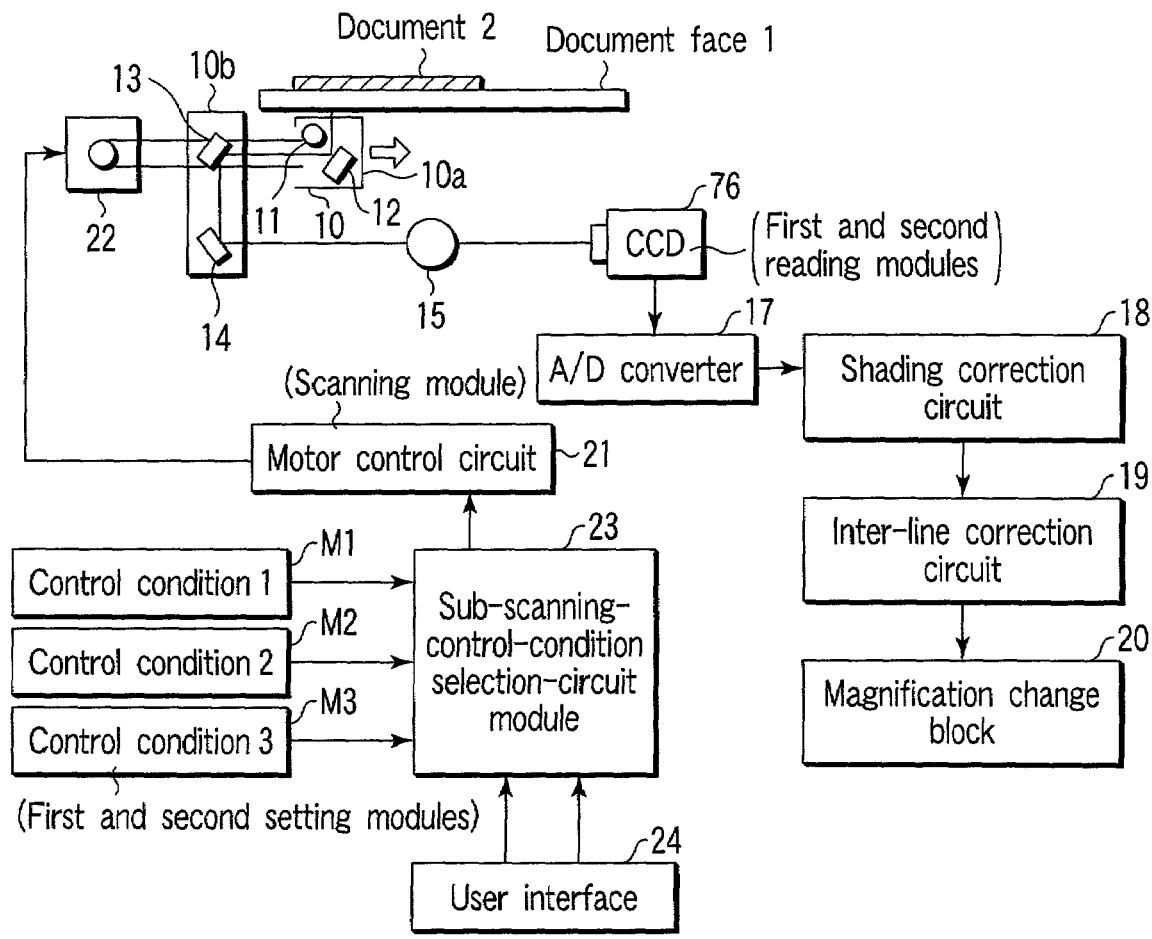
FIG. 7 is a conceptual illustration showing a configuration of the image-processing device of the second embodiment of the present invention.
Figure 8:
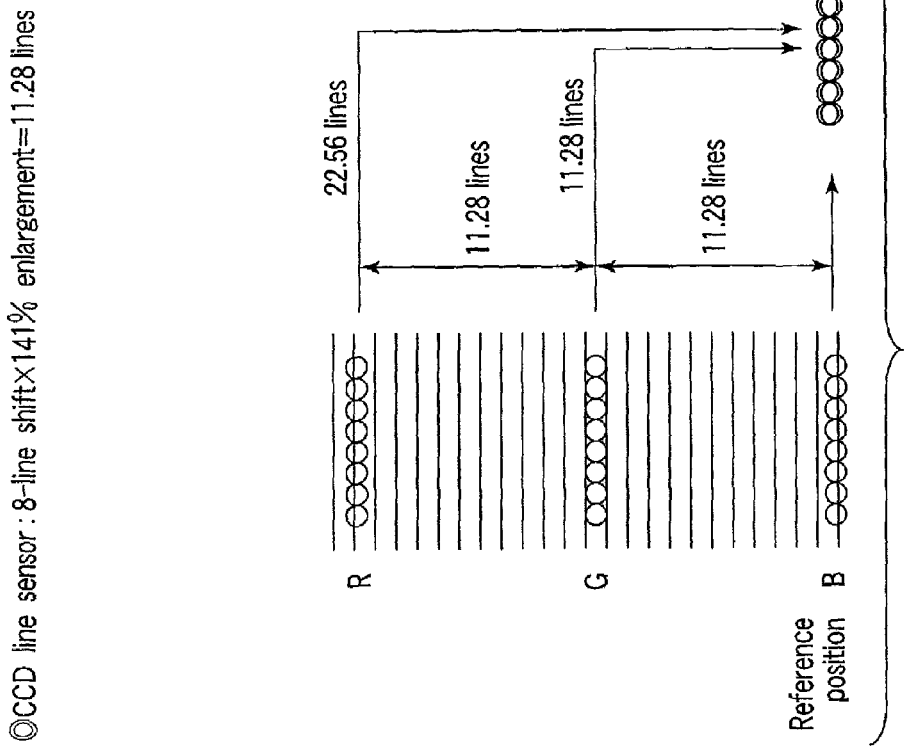
FIG. 8 is a conceptual illustration showing a delay memory necessary for a physical line interval and the magnification change of a CCD used for the second embodiment of the present invention.

FIG. 7 is a block diagram showing a configuration of a reader (scanner) to be applied as an image-processing device of the second embodiment of the present invention.

In the second embodiment, the same parts as those of the first embodiment will not be described.

As shown in FIG. 7, reading of a document image by a scanner of the second embodiment is performed by directly applying light to an exposure lamp 11 set to a first scanning carriage 10a and guiding an optical image formed by the reflected light up to a CCD 76 through a reading optical system including a mirror 12 set to the first scanning carriage 10a, mirrors 13 and 14 set to a second scanning carriage 10b, and an imaging lens 15 set in the device body.

In this case, the first scanning carriage 10a is moved by the driving force supplied from a motor 22 controlled by a motor control circuit 21 as described later and thereby, the mirror 12 set to the first scanning carriage 10a is moved to scan a document shown by an arrow in the sub-scanning of the document.

In this case, the CCD 76 is constituted by a three-line sensor for RGB signals.

Moreover, the optical image guided up to the CCD 76 is photoelectrically converted every RGB signals and thereby, replaced with electric-charge signals for each of a plurality of light-receiving elements (7500 elements for 600 dpi).

These electric-charge signals are output from the CCD 76 as analog signals and converted into digital image signals by an A/D (analog/digital) converter 17.

The image signals converted into digital signals shading-corrected by a shading-correction circuit 18 and then, and inter-line-corrected by an inter-line correction circuit 19 as described later.

Then, the image signals inter-line-corrected by the inter-line correction circuit 19 are supplied to a magnification-change block 20 as image signals magnification-changed in accordance with a carriage moving speed and magnification-changed through an operation to be described later.

Then, the flow of the magnification change obtained by combining the magnification change according to a carriage moving speed and the magnification change according to an operation is described below.

First, the flow of the magnification change according to a carriage moving speed is described below.

The motor control circuit 21 is a circuit for controlling the speed for making the mirror 12 perform scanning in a sub-scanning direction.

The motor control circuit 21 changes scanning speeds of the mirror 12 connected to the motor 22 by controlling the number of revolutions of the motor 22.

A sub-scanning-control-condition determination circuit 23 selects parameters for controlling the number of revolutions of the motor in accordance with a plurality of preset magnifications and supplies them to the motor control circuit 21.

In this case, a parameter for a magnification-change magnification to be set to the sub-scanning-control-condition determination circuit 23 is set to 100%, 2n times of 100%, or 1/2n times of 100% (e.g. 25%, 50%, 100%, 200%, or 400%) (in this case, n is an integer).

Inter-line correction by the inter-line correction circuit 19 is described below.

In this case, the CCD 76 for reading RGB signals physically has an interval of several lines between R and G and between G and B respectively (e.g. interval of eight lines).

Therefore, a green sensor of the three-line CCD 76 reads a position 8 lines ahead of a red sensor of the three-line CCD 76 in the same time under read of 100%.

Moreover, a blue sensor of the three-line CCD 76 reads a position 16 lines ahead of the red sensor of the three-line CCD 76.

Therefore, because a correct image cannot be read when outputting RGB signals from the three-line CCD 76 at the same time, read-line alignment is performed by delaying an output of the green sensor of the three-line CCD 76 by 8 lines and an output of the blue sensor of the CCD 76 by 16 lines by a delay memory (not illustrated).

The above inter-line correction requires delay memories for the total of 64 lines in the case of a magnification change of 400%.

Figure 9:
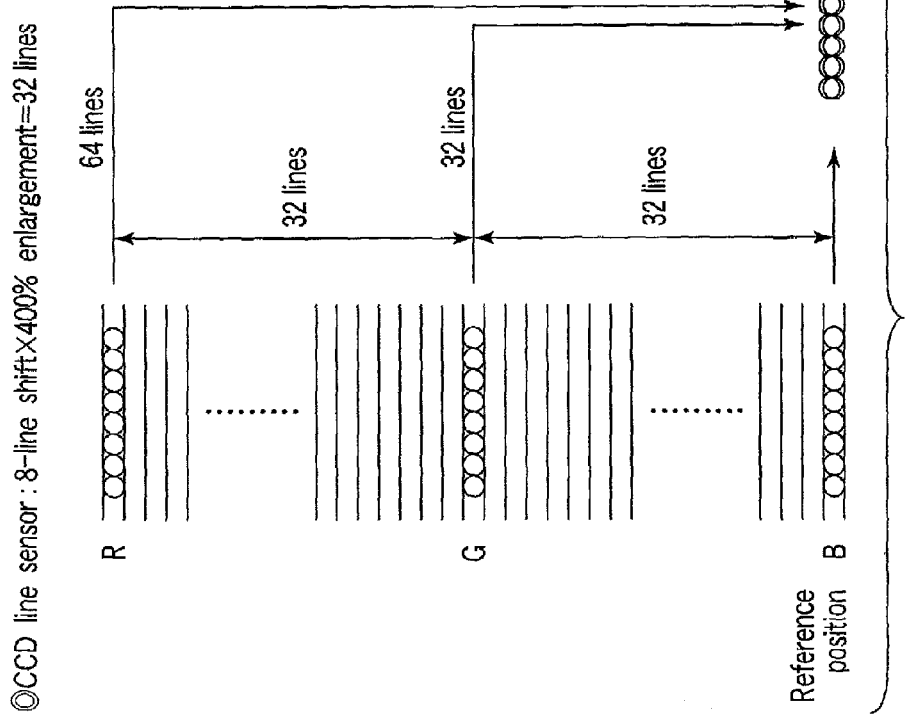
FIG. 9 is a conceptual illustration sowing the number of delay lines for the inter-line correction at 141% to be executed by the image-processing device of the second embodiment of the present invention.

Moreover, the inter-line correction requires a delay of 11.3 lines when performing a sub-scanning magnification change according to a carriage, particularly performing enlargement of non-integral multiples such as an enlargement of 141% as shown in FIG. 9.

Therefore, the inter-line correction in the above case requires a circuit for delaying 11 lines and a circuit for delaying 0.3 line.

Although a delay for each line can be simply realized by delaying the line by a delay memory, a delay of less than one line, such as 0.3 lines, is line-corrected by performing an operation between two lines.

Figure 10:
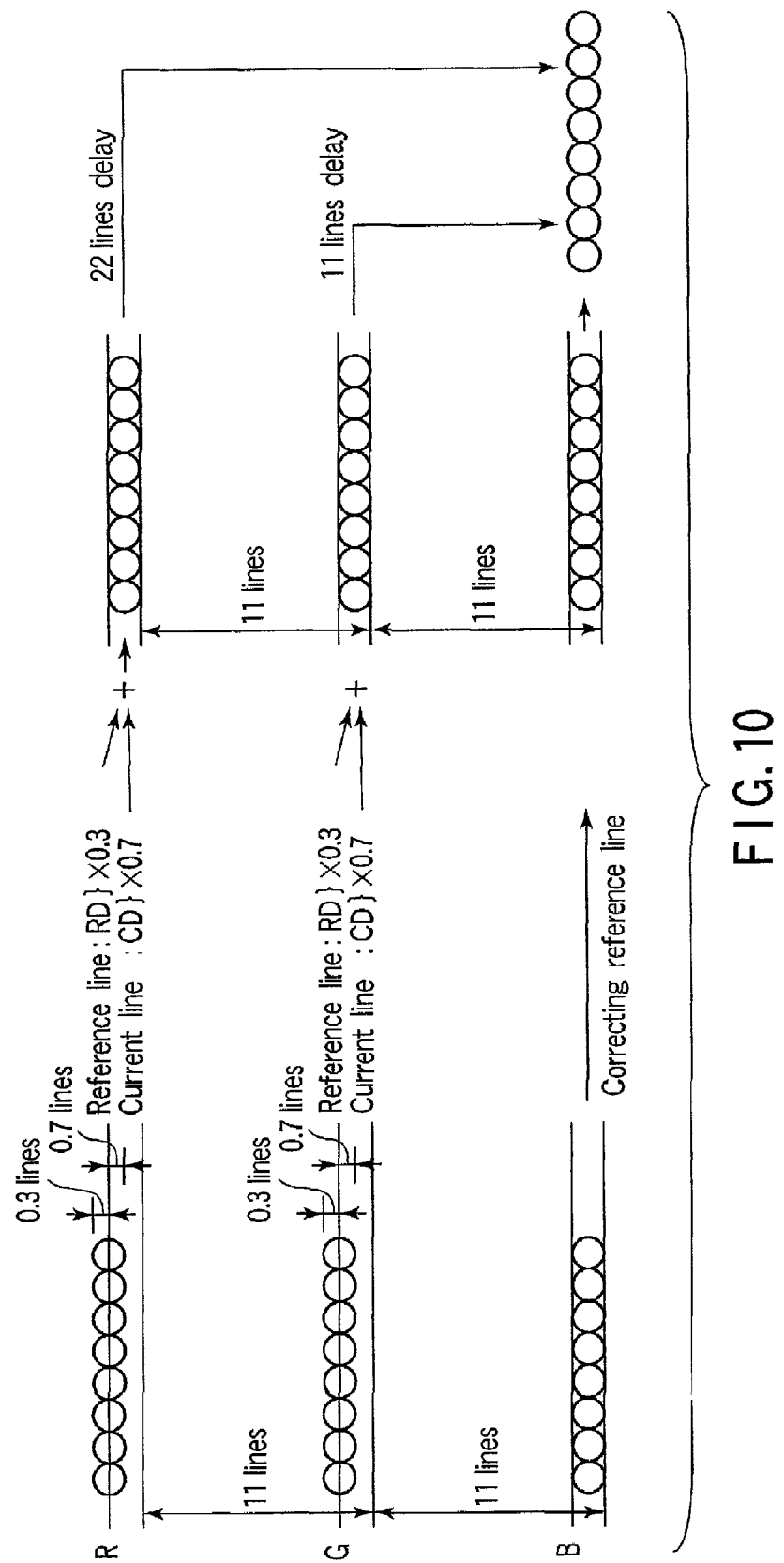
FIG. 10 is a conceptual illustration showing a line delay of less than one line to be executed by the image-processing device of the second embodiment of the present invention.

Specifically, as shown in FIG. 10, for a delay of 0.3 lines of a R signal, CD' realizing a delay of less than one line is generated by computing a current line CD (line to be read at the present time) and a reference line RD (line read one line before) in accordance with the following expression.

$$CD' = RD \times 0.3 + CD \times 0.7$$

Similarly, a delay of less than one line is realized for a G signal through the same operation as the above.

In this case, for a B signal, a delay of less than one line is not performed because of using the signal as a correction reference line.

Thus, when performing a magnification change between 25 and 40% according to carriage scanning, a computing circuit is necessary because of performing a delay of less than one line.

Therefore, by setting a magnification-change-magnification parameter to 100%, 2n times of 100%, or 1/2n times of 100% as in the above setting example, inter-line correction can be realized by a delay of only a delay memory and thereby it is possible to reduce the hard-ware cost because a circuit can be simplified.

The motor control circuit 21 compares a magnification-change magnification with a carriage-scanning-determination threshold value and decides a carriage-scanning speed in accordance with the magnification of the values.

Then, the flow of a magnification change according to operations after a sub-scanning magnification change according to a carriage is described below.

When RGB signals input from the three-line CCD 76 are input to the magnification-change block 20 shown in FIG. 4 as images after the sub-scanning magnification change according to a carriage moving speed, a magnification change method in a sub-scanning direction is decided by a switch 41.

In this case, the sub-scanning-directional magnification change uses a sub-scanning-enlargement computing-unit module 42 serving as a processing block for performing sub-scanning enlargement and a sub-scanning-reduction computing-unit module 43 serving as a processing block for performing sub-scanning reduction.

The switch 41 selects the sub-scanning magnification-change method in accordance with the processing-method selection information output from a sub-scanning-magnification determination circuit 44.

Then, main-scanning magnification change is applied to the sub-scanning-magnification-changed image.

In this case, a switch 45 selects reduction or enlargement in accordance with the determination information output from a main-scanning-magnification determination circuit 46.

Thus, by limiting a magnification change according to a carriage for a sub-scanning magnification change, it is possible to simplify the operation for inter-line correction.

Thereby, it is possible to reduce the hardware cost.

Although carriage-scanning magnifications include five levels of 25%, 50%, 100%, 200%, and 400% in the case of the above embodiment, it is also allowed to use not only the above five levels of magnifications but also a plurality of desired magnifications.

Moreover, although carriage-scanning magnifications include five levels of 25%, 50%, 100%, 200%, and 400% in the case of the above embodiment, ranges such as 25–26%, 49–51%, 99–101%, 199–201%, and 399–400% for the carriage-scanning magnifications may also be used.

Furthermore, although the magnification change according to operations is computed in accordance with RGB signals in the case of the above embodiment, operations may be performed in accordance with other signals, such as a CMYK signal.

Furthermore, although enlargement is performed through linear interpolation in the above embodiment, other enlargement methods may be used.

Furthermore, although reduction is performed by the projection method, other reduction methods may be used.

As described above, according to an image-processing device of the present invention, an advantage can be obtained in that it is possible to reduce the hardware cost for vibration measures by combining making a carriage scan in accordance with a preset control condition with generating a magnification-changed image through operations at a magnification other than a preset magnification and moreover, suppress the skip of a thin line or diagonal line and obtain a preferable image by adaptively changing enlargement and reduction through the magnification change according to operations.

Therefore, according to the present invention, by using the method of performing the sub-scanning-directional magnification change by conventionally changing carriage-scanning speeds and the method of performing the sub-scanning-directional magnification change through signal processing together, it is possible to provide an image-processing device and a method for controlling the device capable of avoiding problems including vibrations caused by moving a carriage at a high speed, reducing the size of a circuit for inter-line correction of RGB signals and the number of delay memories, and suppressing image-quality deterioration in a magnification change by adaptively changing enlargement and reduction, and effectively realizing a sub-scanning-directional magnification change.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image-processing device comprising:
a first reading module which reads a first signal in a main scanning direction of an image of a document;
a second reading module which reads a second signal in the main scanning direction of the image of the document;
a scanning module including a carriage which relatively moves the first and second reading modules and the image of the document to make the first and second modules scan the image of the document in its sub-scanning direction;
a scanning-control-condition selecting module which selects scanning control conditions of the scanning module in accordance with a plurality of read magnifications preset as read magnifications by the first and second reading modules to the document;
a first setting module which sets the scanning control conditions selected by the scanning-control-condition selecting module to a plurality of control conditions in accordance with the read magnification of the first reading module;
a second setting module which sets the scanning control conditions selected by the scanning-control-condition selecting module to a plurality of control conditions in accordance with a read magnification of the second reading module; and
an operating module which, at least when set to a read magnification other than said plurality of read magnifications preset, performs an operating process to compute image data having a corresponding read magnification other than said plurality of read magnifications preset to the sub-scanning direction in accordance with the first and second signals read by the first and second reading modules at any one of said plurality of read magnifications preset, wherein, the operating process by the operating module.

2. An image-processing device according to claim 1, wherein the operating module is provided with first and second operating modules which compute the image data values at a corresponding read magnification through enlargement and reduction operations in accordance with the first and second signals read by the first and second reading modules at any one of the above preset read magnifications when set to a read magnification other than the above preset read magnifications and a changing module for adaptively changing the first and second operating modules in accordance with a set read magnification.

3. An image-processing device according to claim 1, wherein the first and second setting modules set the scanning control conditions in accordance with light-receiving-sensitivity ratios of the first and second reading modules.

4. An image-processing device according to claim 1, wherein the first and second setting modules set the scanning conditions to a specific magnification and magnifications upper and lower than the specific magnification in order to prevent vibrations caused by the carriage scan.

5. An image-processing device comprising:
a first reading module which reads a monochrome signal in a main scanning direction of an image of a document;
a second reading module which reads a color signal in the main scanning direction of the image of the document;
a scanning module including a carriage which relatively moves the first and second reading modules and the image of the document to make first and second reading modules scan the image of the document in its sub-scanning direction at a predetermined speed based on predetermined scanning control conditions in accordance with 100%, 2n times of 100%, or 1/2n times of 100% (n being an integer) as a plurality of read magnifications preset as read magnifications by the first and second reading modules, the predetermined scanning control conditions being set in accordance with said plurality of read magnifications preset so as to change magnifications of the image of the document in the sub-scanning direction by the first and second reading modules by changing the scanning speed of the carriage;
a correcting module which aligns every line the color signals read by the second reading module which is moved for scanning by the scanning module in the sub-scanning direction based on the predetermined scanning control conditions in accordance with 100%. 2n times of 100%, or 1/2n times of 100% (n being an integer) as the read magnifications preset as the read magnifications by the second reading module, delaying the color signals with a delay memory by a predetermined number of lines;
a scan-control-condition selecting module which selects scan-control conditions of the scanning module in accordance with a plurality of read magnifications preset as read magnifications of the document by the first and second reading modules;
a setting module which sets the scanning control conditions selected by the scan-control-condition selecting module to a plurality of control conditions in accordance with the correction of color signals to be corrected by the correcting module every line; and an operating module which computes the image data of a corresponding read magnification through operations in accordance with the first and second signals read by the first and second reading modules at any one of the preset read magnifications when set to a read magnification other than the preset read magnifications.

6. An image-processing device comprising:
a reading module which reads color signals in a main scanning direction of an image of the document;
a scanning module including a carriage which relatively moves the reading module and the image of the document to make the reading module scan the image of the document in its sub-scanning direction at a predetermined speed based on predetermined scanning control conditions in accordance with 100%, 2n times of 100%, or 1/2n times of 100% (n being an integer) as a plurality of read magnifications preset as read magnifications by the reading module, the predetermined scanning control conditions being set in accordance with said plurality of read magnifications preset so as to change magnifications of the image of the document in the sub-scanning direction by the reading module by changing the scanning speed of the carriage;
a correcting module which aligns every line the color signals read by the reading module which is moved for scanning by the scanning module in the sub-scanning direction based on the predetermined scanning control conditions in accordance with 100%, 2n times of 100%, or 1/2n times of 100% (n being an integer) as said plurality of read magnifications preset as the read magnifications by the reading module, by delaying the color signals with a delay memory by a predetermined number of lines;
a scan-control-condition selecting module which selects scan-control conditions of the scanning module in accordance with a plurality of read magnifications preset as read magnifications of the document by the reading module;
a setting module which sets the scanning control conditions selected by the scanning-control-condition selecting module to a plurality of control conditions in accordance with the correction of color signals to be corrected by the correcting module every line; and
an operating module which computes the image data of a corresponding read magnification through operations in accordance with the color signals read by the reading modules at any one of the preset read magnifications when set to a read magnification other than the preset read magnifications.

7. An image-processing device comprising:
a first reading module having a first line sensor with a first light-receiving sensitivity and a reading optical system which guides an optical image of a document to the first line sensor, the first reading module reading first signals in a predetermined reading area in a main scanning direction of the image of the document;
a second reading module having a second line sensor with a second light-receiving sensitivity different from the first light-receiving sensitivity and a reading optical system which guides the optical image of the document to the second line sensor, the second reading module reading second signals in the same reading area as that of the first reading module in the main scanning direction of the image of the document;
a scanning module including a carriage which relatively moves the first and second reading modules and the image of the document to make the first and second reading modules scan the image of the document in its sub-scanning direction at a predetermined speed based on predetermined scanning control conditions in accordance with a plurality of read magnifications preset, the predetermined scanning control conditions being set in accordance with said plurality of read magnifications preset so as to change magnifications of the image of the document in the sub-scanning direction by the first and second reading modules by changing the scanning speed of the carriage;

a scanning-control-condition selecting module which selects the predetermined scanning control conditions so as to change the scanning speed of the carriage of the scanning module in accordance with said plurality of read magnifications preset as the read magnifications by the first and second reading modules to the document;

a first setting module which sets the predetermined scanning control conditions for changing the scanning speed of the carriage of the scanning module selected by the scanning-control-condition selecting module to a first plurality of control conditions as first parameters including said plurality of read magnifications preset to the first reading module and the scanning speed of the carriage in accordance with said plurality of read magnifications;

a second setting module which sets the predetermined scanning control conditions for changing the scanning speed of the carriage of the scanning module selected by the scanning-control-condition selecting module to a second plurality of control conditions as second parameters including said plurality of read magnifications preset to the second reading module and the scanning speed of the carriage in accordance with the ratio of the light-receiving sensitivities of the first and second reading modules with said plurality of read magnifications and said first plurality of control conditions as standards; and an operating module which, at least when set to a read magnification other than said plurality of read magnifications preset, performs an operating process to compute image data having a corresponding read magnification other than said plurality of read magnifications preset to the sub-scanning direction in accordance with the first and second signals read by the first and second reading modules at any one of said plurality of read magnifications preset based on: said first plurality of control conditions as the first parameters including said plurality of read magnifications preset to the first reading module and the scanning speed of the carriage in accordance with said plurality of read magnifications; and said second plurality of control conditions as the second parameters including said plurality of read magnifications preset to the second reading module and the scanning speed of the carriage in accordance with the ratio of the light-receiving sensitivities of the first and second reading modules with said plurality of read magnifications and said first plurality of control conditions as standards, said first plurality of control conditions and said second plurality of control conditions being set in accordance with said plurality of read magnifications preset so as to change the magnifications in the sub-scanning direction by changing the scanning speed of the carriage and being set by the first setting module and the second setting module, respectively, as the predetermined scanning control conditions selected by the scanning-control-condition selecting module.

8. An image-processing device according to claim 7, wherein the operating module is provided with first and second operating modules which compute the image data values at a corresponding read magnification through enlargement and reduction operations in accordance with the first and second signals read by the first and second reading modules at any one of the above preset read magnifications when set to a read magnification other than the above preset read magnifications and a changing module for adaptively changing the first and second operating modules in accordance with a set read magnification.

9. An image-processing device according to claim 7, wherein the first and second setting modules set the scanning conditions to a specific magnification and magnifications upper and lower than the specific magnification in order to prevent vibrations caused by the carriage scan.

10. An image-processing device comprising:
a first reading module having a first line sensor with a first light-receiving sensitivity, and a reading optical system which guides an optical image of a document to the first line sensor, the first reading module reading monochrome signals in a predetermined reading area in a main scanning direction of the image of the document;
a second reading module having a second line sensor with a second light-receiving sensitivity different from the first light-receiving sensitivity, and a reading optical system which guides the optical image of the document to the second line sensor, the second reading module reading color signals in the same reading area as that of the first reading module in the main scanning direction of the image of the document;
a scanning module including a carriage which relatively moves the first and second reading modules and the image of the document to make the first and second reading modules scan the image of the document in its sub-scanning direction at a predetermined speed based on predetermined scanning control conditions in accordance with 100%, 2n times of 100%, or 1/2n times of 100% (n being an integer) as a plurality of read magnifications preset as read magnifications by the first and second reading modules to the document, the predetermined scanning control conditions being set in accordance with said plurality of read magnifications preset so as to change magnifications of the image of the document in the sub-scanning direction by the first and second reading modules by changing the scanning speed of the carriage;
a correcting module which aligns every line the color signals read by the second reading module which is moved for scanning by the scanning module in the sub-scanning direction based on the predetermined scanning control conditions in accordance with 100%, 2n times of 100%, or 1/2n times of 100% (n being an integer) as the read magnifications preset as the read magnifications by the second reading module, by delaying the color signals with a delay memory by a predetermined number of lines;
a scanning-control-condition selecting module which selects the predetermined scanning control conditions for changing the scanning speed of the carriage of the scanning module in accordance with said plurality of read magnifications preset as the read magnifications by the first and second reading modules to the document;

a first setting module which sets the predetermined scanning control conditions for changing the scanning speed of the carriage of the scanning module selected by the scanning-control-condition selecting module to a first plurality of control conditions as first parameters including said plurality of read magnifications preset to the first reading module and the scanning speed of the carriage in accordance with said plurality of read magnifications;

a second setting module which sets the predetermined scanning control conditions for changing the scanning speed of the carriage of the scanning module selected by the scanning-control-condition selecting module to a second plurality of control conditions as second parameters including said plurality of read magnifications preset to the second reading module and the scanning speed of the carriage in accordance with the ratio of the light-receiving sensitivities of the first and second reading modules with said plurality of read magnifications, the correction of the color signals corrected by the correcting module every line and said first plurality of control conditions as standards; and an operating module which, at least when set to a read magnification other than said plurality of read magnifications preset, performs an operating process to compute image data having a corresponding read magnification other than said plurality of read magnifications preset to the sub-scanning direction in accordance with the monochrome signals and the color signals read by the first and second reading modules at any one of said plurality of read magnifications based on: said first plurality of control conditions as the first parameters including said plurality of read magnifications preset to the first reading module and the scanning speed of the carriage in accordance with said plurality of read magnifications; and said second plurality of control conditions as the second parameters including said plurality of read magnifications preset to the second reading module and the scanning speed of the carriage in accordance with the ratio of the light-receiving sensitivities of the first and second reading modules with said plurality of read magnifications, the correction of the color signals corrected by the correcting module every line and said first plurality of control conditions as standards, said first plurality of control conditions and said second plurality of control conditions being set in accordance with said plurality of read magnifications preset so as to change the magnifications in the sub-scanning direction by changing the scanning speed of the carriage and being set by the first setting module and the second setting module, respectively, as the predetermined scanning control conditions selected by the scanning-control-condition selecting module.

11. An image-processing device comprising:

a reading module which reads color signals in a main scanning direction of an image of a document;

a scanning module including a carriage which relatively moves the reading module and the image of the document to make the reading module scan the image of the document in its sub-scanning direction at a predetermined speed based on predetermined scanning control conditions in accordance with 100%, 2n times of 100%, or 1/2n times of 100% (n being an integer) as a plurality of read magnifications preset as read magnifications by the reading module to the document, the predetermined scanning control conditions being set in accordance with said plurality of read magnifications preset so as to change magnifications of the image of the document in the sub-scanning direction by the reading module by changing the scanning speed of the carriage;

a correcting module which aligns every line the color signals read by the reading module which is moved for scanning by the scanning module in the sub-scanning direction based on the predetermined scanning control conditions in accordance with 100%, 2n times of 100%, or 1/2n times of 100% (n being an integer) as said plurality of read magnifications preset as the read magnifications by the reading module, by delaying the color signals with a delay memory by a predetermined number of lines;

a scanning-control-condition selecting module which selects the predetermined scanning control conditions so as to change the scanning speed of the carriage of the scanning module in accordance with said plurality of read magnifications preset as the read magnifications by the reading module to the document;

a setting module which sets the predetermined scanning control conditions for changing the scanning speed of the carriage of the scanning module selected by the scanning-control-condition selecting module to a plurality of control conditions as parameters including said plurality of read magnifications preset to the reading module and the scanning speed of the carriage in accordance with said plurality of read magnifications and the correction of the color signals corrected by the correcting module every line; and an operating module which, at least when set to a read magnification other than said plurality of read magnifications preset, performs an operating process to compute image data having a corresponding read magnification other than said plurality of read magnifications preset to the sub-scanning direction in accordance with the color signals read by the reading module at any one of said plurality of read magnifications preset based on said plurality of control conditions as the parameters including said plurality of read magnifications preset to the reading module set by the setting module, and the scanning speed of the carriage in accordance with said plurality of read magnifications and the correction of the color signals corrected by the correcting module every line, said plurality of control conditions being set in accordance with said plurality of read magnifications preset so as to change the magnifications in the sub-scanning direction by changing the scanning speed of the carriage and being set by the setting module as the predetermined scanning control conditions selected by the scanning-control-condition selecting module.

12. An image-processing device comprising:

a reading module which reads signals in a main scanning direction of an image of a document;

a scanning module including a carriage which relatively moves the reading module and the image of the document to make the reading module scan the image of the document in its sub-scanning direction at a predetermined speed based on predetermined scanning control conditions in accordance with a plurality of read magnifications preset, the predetermined scanning control conditions being set in accordance with said plurality of read magnifications preset so as to change magnifications of the image of the document in the sub-scanning direction by the reading module by changing the scanning speed of the carriage;

a scanning-control-condition selecting module which selects the predetermined scanning control conditions so as to change the scanning speed of the carriage of the scanning module in accordance with said plurality of read magnifications preset as the read magnifications to the reading module to the document;

a setting module which sets the predetermined scanning control conditions for changing the scanning speed of the carriage of the scanning module selected by the scanning-control-condition selecting module to a plurality of control conditions as parameters including said plurality of read magnifications preset to the reading module and the scanning speed of the carriage in accordance with said plurality of read magnifications;

a first operating module which, at least when set to a read magnification other than said plurality of read magnifications preset, performs an enlargement operating process to compute image data having a corresponding read magnification other than said plurality of read magnifications preset to the sub-scanning direction in accordance with the signals read by the reading module at any one of said plurality of read magnifications preset based on said plurality of control conditions as the parameters including said plurality of read magnifications preset to the reading module and the scanning speed of the carriage in accordance with said plurality of read magnifications preset, said plurality of control conditions being set in accordance with said plurality of read magnifications preset so as to change the magnifications in the sub-scanning direction by changing the scanning speed of the carriage and being set by the setting module as the predetermined scanning control conditions selected by the scanning-control-condition selecting module;

a second operating module which, at least when set to a read magnification other than said plurality of read magnifications preset, performs a reduction operating process to compute image data having a corresponding read magnification other than said plurality of read magnifications preset to the sub-scanning direction in accordance with the signals read by the reading module at any one of said plurality of read magnifications preset based on said plurality of control conditions as the parameters including said plurality of read magnifications preset to the reading module and the scanning speed of the carriage in accordance with said plurality of read magnifications, said plurality of control conditions being set in accordance with said plurality of read magnifications preset so as to change the magnifications in the sub-scanning direction by changing the scanning speed of the carriage and being set by the setting module as the predetermined scanning control conditions selected by the scanning-control-condition selecting module; and a changing module which adaptively changes the first and second operating modules in accordance with a corresponding read magnification other than said plurality of read magnifications preset to the sub-scanning direction.

13. An image-processing device according to claim 12, wherein the setting module sets the scanning-control-conditions to a specific magnification and magnifications upper and lower than the specific magnification in order to prevent vibrations caused by the carriage scanning.

14. An image-processing device comprising:

first reading means having a first line sensor with a first light-receiving sensitivity, and a reading optical system which guides an optical image of a document to the first line sensor, the first reading means reading first signals in a predetermined reading area in a main scanning direction of the image of the document;

second reading means having a second line sensor with a second light-receiving sensitivity different from the first light-receiving sensitivity, and a reading optical system which guides the optical image of the document to the second line sensor, the second reading means reading second signals in the same reading area as that of the first reading means in the main scanning direction of the image of the document;

scanning means including a carriage which relatively moves the first and second reading means and the image of the document to make the first and second reading means scan the image of the document in its sub-scanning direction at a predetermined speed based on predetermined scanning control conditions in accordance with a plurality of read magnifications preset, the predetermined scanning control conditions being set in accordance with said plurality of read magnifications preset so as to change magnifications of the image of the document in the sub-scanning direction by the first and second reading means by changing the scanning speed of the carriage;

scanning-control-condition selecting means for selecting the predetermined scanning control conditions so as to change the scanning speed of the carriage of the scanning means in accordance with said plurality of read magnifications preset as the read magnifications by the first and second reading means to the document;

first setting means for setting the predetermined scanning control conditions for changing the scanning speed of the carriage of the scanning means selected by the scanning-control-condition selecting means to a first plurality of control conditions as first parameters including said plurality of read magnifications preset to the first reading means and the scanning speed of the carriage in accordance with said plurality of read magnifications;

second setting means for setting the predetermined scanning control conditions for changing the scanning speed of the carriage of the scanning means selected by the scanning-control-condition selecting means to a second plurality of control conditions as second parameters including said plurality of read magnifications preset to the second reading means and the scanning speed of the carriage in accordance with the ratio of the light-receiving sensitivities of the first and second reading means with said plurality read magnifications and said first plurality of control conditions as standards; and operating means for, at least when set to a read magnification other than said plurality of read magnifications preset, performing an operating process to compute image data having a corresponding read magnification other than said plurality of read magnifications preset to the sub-scanning direction in accordance with the first and second signals read by the first and second reading means at any one of said plurality of read magnifications preset based on: said first plurality of control conditions as the first parameters including said plurality of read magnifications preset to the first reading means and the scanning speed of the carriage in accordance with said plurality of read magnifications; and said second plurality of control conditions as the second parameters including said plurality of read magnifications preset to the second reading means and the scanning speed of the carriage in accordance with the ratio of the light-receiving sensitivities of the first and second reading means with said plurality of read magnifications and said first plurality of control conditions as standards, said first plurality of control conditions and said second plurality of control conditions being set in accordance with said plurality of read magnifications preset so as to change the magnifications in the sub-scanning direction by changing the scanning speed of the carriage and being set by the first setting means and the second setting means, respectively, as the predetermined scanning control conditions selected by the scanning-control-condition selecting means.

15. An image-processing device according to claim 14, wherein the operation means is provided with first and second operation means for computing the image data at a corresponding read magnification through enlargement and reduction operations in accordance with the first and second signals read by the first and second reading means at any one of the preset read magnifications when set to a read magnification other than the preset read magnifications and change means for adaptively changing the first and second operation means in accordance with a set read magnification.

16. An image-processing device according to claim 14, wherein the first and second setting means set the scanning control conditions to a specific magnification and magnifications upper and lower than the specific magnification in order to prevent vibrations caused by the carriage scanning.

17. An image-processing device comprising:
first reading means having a first line sensor with a first light-receiving sensitivity, and a reading optical system which guides an optical image of a document to the first line sensor, the first reading means reading monochrome signals in a predetermined reading area in a main scanning direction of the image of the document;
second reading means having a second line sensor with a second light-receiving sensitivity different from the first light-receiving sensitivity, and a reading optical system which guides the optical image of the document to the second line sensor, the second reading means reading color signals in the same reading area as that of the first reading means in the main scanning direction of the image of the document;
scanning means including a carriage which relatively moves the first and second reading means and the image of the document to make the first and second reading means scan the image of the document in its sub-scanning direction based on predetermined scanning control conditions in accordance with 100%, 2n times of 100%, or 1/2n times of 100% (n being an integer) as a plurality of read magnifications preset as read magnifications by the first and second reading means to the document, the predetermined scanning control conditions being set in accordance with said plurality of read magnifications preset so as to change magnifications of the image of the document in the sub-scanning direction by the first and second reading means by changing the scanning speed of the carriage;
correcting means for aligning every line color signals read by the second reading means which is moved for scanning by the scanning means in the sub-scanning direction based on the predetermined scanning control conditions in accordance with 100%, 2n times of 100%, or 1/2n times of 100% (n being an integer) as said plurality of read magnifications preset as the read magnifications by the second reading means, by means of a delay memory which delays the color signals by a predetermined line;
scanning-control-condition selecting means for selecting the predetermined scanning control conditions so as to change the scanning speed of the carriage of the scanning means in accordance with said plurality of read magnifications preset as the read magnifications by the first and second reading means to the document;
first setting means for setting the predetermined scanning control conditions for changing the scanning speed of the carriage of the scanning means selected by the scanning-control-condition selecting means to a first plurality of control conditions as first parameters including said plurality of read magnifications preset to the first reading means and the scanning speed of the carriage in accordance with said plurality of read magnifications;
second setting means for setting the predetermined scanning control conditions for changing the scanning speed of the carriage of the scanning means selected by the scanning-control-condition selecting means to a second plurality of control conditions as second parameters including said plurality of read magnifications preset to the second reading means and the scanning speed of the carriage in accordance with the ratio of the light-receiving sensitivities of the first and second reading means with said plurality of read magnifications, the correction of the color signals corrected by the correcting means and said first plurality of control conditions as standards; and
operating means for, at least when set to a read magnification other than said plurality of read magnifications preset, performing an operating process to compute image data having a corresponding read magnification other than said plurality of read magnifications preset to the sub-scanning direction in accordance with the first and second signals read by the first and second reading means at any one of said plurality of read magnifications preset based on: said first plurality of control conditions as the first parameters including said plurality of read magnifications preset to the first reading means and the scanning speed of the carriage in accordance with said plurality of read magnifications; and said second plurality of control conditions as the second parameters including said plurality of read magnifications preset to the second reading means and the scanning speed of the carriage in accordance with the ratio of the light-receiving sensitivities of the first and second reading means with said plurality of read magnifications preset, the correction of the color signals corrected by the correcting means every line and said first plurality of control conditions as standards, said first plurality of control conditions and said second plurality of control conditions being set in accordance with said plurality of read magnifications preset so as to change the magnifications in the sub-scanning direction by changing the scanning speed of the carriage and being set by the first setting means and the second setting means, respectively, as the predetermined scanning control conditions selected by the scanning-control-condition selecting means.

18. An image-processing device comprising:
reading means for reading color signals in a main scanning direction of an image of a document;
scanning means including a carriage which relatively moves the reading means and the image of the document to make the reading means scan the image of the document in its sub-scanning direction based on predetermined scanning control conditions in accordance with 100%, 2n times of 100%, or 1/2n times of 100% (n being an integer) as a plurality of read magnifications preset as read magnifications by the reading means to the document, the predetermined scanning control conditions being set in accordance with said plurality of read magnifications preset so as to change magnifications of the image of the document in the sub-scanning direction by the reading means by changing the scanning speed of the carriage; correcting means for aligning every line color signals read by the reading means which is moved for scanning by the scanning means in the sub-scanning direction based on the predetermined scanning control conditions in accordance with 100%, 2n times of 100%, or 1/2n times of 100% (n being an integer) as said plurality of read magnifications preset as the read magnifications by the reading means, by means of a delay memory which delays the color signals by a predetermined line;

scanning-control-condition selecting means for selecting the predetermined scanning control conditions so as to change the scanning speed of the carriage of the scanning means in accordance with said plurality of read magnifications preset as the read magnifications by the reading means to the document;

setting means for setting the predetermined scanning control conditions for changing the scanning speed of the carriage of the scanning means selected by the scanning-control-condition selecting means to a plurality of control conditions as parameters including said plurality of read magnifications preset to the reading means and the scanning speed of the carriage in accordance with said plurality of read magnifications and the correction of the color signals corrected by the correcting means; and operating means for, at least when set to a read magnification other than said plurality of read magnifications preset, performing an operating process to compute image data having a corresponding read magnification other than said plurality of read magnifications preset to the sub-scanning direction in accordance with the color signals read by the reading means at any one of said plurality of read magnifications preset based on said plurality of control conditions as the parameters including said plurality of read magnifications preset to the reading means and the scanning speed of the carriage in accordance with said plurality of read magnifications and the correction of the color signals corrected by the correcting means every line, said plurality of control conditions being set in accordance with said plurality of read magnifications preset so as to change the magnifications in the sub-scanning direction by changing the scanning speed of the carriage and being set by the setting means as the predetermined scanning control conditions selected by the scanning-control-condition selecting means.

19. An image-processing device comprising:

reading means for reading signals in a main scanning direction of an image of a document;

scanning means including a carriage which relatively moves the reading means and the image of the document to make the reading means scan the image of the document in its sub-scanning direction at a predetermined speed based on predetermined scanning control conditions in accordance with a plurality of read magnifications preset, the predetermined scanning control conditions being set in accordance with said plurality of read magnifications preset so as to change magnifications of the image of the document in the sub-scanning direction by the reading means by changing the scanning speed of the carriage;

scanning-control-condition selecting means for selecting the predetermined scanning control conditions so as to change the scanning speed of the carriage of the scanning means in accordance with said plurality of read magnifications preset as the read magnifications by the reading means to the document;

setting means for setting the predetermined scanning control conditions for changing the scanning speed of the carriage of the scanning means selected by the scanning-control-condition selecting means to a plurality of control conditions as parameters including said plurality of read magnifications preset to the reading means and the scanning speed of the carriage in accordance with said plurality of read magnifications;

first operating means for, at least when set to a read magnification other than said plurality of read magnifications preset, performing an enlargement operating process to compute image data having a corresponding read magnification other than said plurality of read magnifications preset to the sub-scanning direction in accordance with the signals read by the reading means at any one of said plurality of read magnifications preset based on said plurality of control conditions as the parameters including said plurality of read magnifications preset to the reading means and the scanning speed of the carriage in accordance with said plurality of read magnifications, said plurality of control conditions being set in accordance with said plurality of read magnifications preset so as to change the magnifications in the sub-scanning direction by changing the scanning speed of the carriage and being set by the setting means as the predetermined scanning control conditions selected by the scanning-control-condition selecting means;

second operating means for, at least when set to a read magnification other than said plurality of read magnifications preset, performing a reduction operating process to compute image data having a corresponding read magnification other than said plurality of read magnifications preset to the sub-scanning direction in accordance with the signals read by the reading means at any one of said plurality of read magnifications preset based on said plurality of control conditions as the parameters including said plurality of read magnifications preset to the reading means and the scanning speed of the carriage in accordance with said plurality of read magnifications, said plurality of control conditions being set in accordance with said plurality of read magnifications preset so as to change the magnifications in the sub-scanning direction by changing the scanning speed of the carriage and being set by the setting means as the predetermined scanning control conditions selected by the scanning-control-condition selecting means; and changing means for adaptively changing the first and second operating means in accordance with a corresponding read magnification other than said plurality of read magnifications preset.

20. An image-processing device according to claim 19, wherein the setting means sets the scanning control conditions to a specific magnification and magnifications upper and lower than the specific magnification in order to prevent vibrations caused by the carriage scanning.

21. A method for controlling an image-processing device provided with scanning means including a carriage which relatively moves first and second reading means for reading first and second signals in a same reading area in a main scanning direction of an image of a document and the image of the document to make the first and second reading means scan the image of the document in its sub-scanning direction at a predetermined speed, the first and second reading means having first and second line sensors respectively having a first light-receiving sensitivity, and a second light-receiving sensitivity different from the first light-receiving sensitivity, and a reading optical system which guides an optical image of a document to the first and second line sensors, the method comprising:

selecting predetermined scanning control conditions for relatively moving the first and second line sensors and the image of the document to make the first and second line sensors scan the image of the document in its sub-scanning direction by the scanning means in accordance with a plurality of read magnifications preset as read magnifications by the first and second line sensors to the document, the predetermined scanning control conditions being set in accordance with said plurality of read magnifications preset so as to change magnifications of the image of the document in the sub-scanning direction by the first and second line sensors by changing the scanning speed of the carriage;

setting the predetermined scanning control conditions for changing the scanning speed of the carriage of the scanning means to a first plurality of control conditions as first parameters including said plurality of read magnifications preset to the first line sensor and the scanning speed of the carriage in accordance with said plurality of read magnifications;

setting the predetermined scanning control conditions for changing the scanning speed of the carriage of the scanning means to a second plurality of control conditions as second parameters including said plurality of read magnifications preset to the second line sensor and the scanning speed of the carriage in accordance with the ratio of the light-receiving sensitivities of the first and second line sensors with said plurality of read magnifications and said first plurality of control conditions as standards; and at least when set to a read magnification other than said plurality of read magnifications preset, performing an operating process to compute image data having a corresponding read magnification other than said plurality of read magnifications preset to the sub-scanning direction in accordance with the first and second signals read by the first and second line sensors at any one of said plurality of read magnifications preset based on: said first plurality of control conditions as the first parameters including said plurality of read magnifications preset to the first line sensor and the scanning speed of the carriage in accordance with said plurality of read magnifications; and said second plurality of control conditions as the second parameters including said plurality of read magnifications preset to the second line sensor and the scanning speed of the carriage in accordance with the ratio of the light-receiving sensitivities of the first and second line sensors with said plurality of read magnifications and said first plurality of control conditions as standards, said first plurality of control conditions and said second plurality of control conditions being set in accordance with said plurality of read magnifications preset so as to change the magnifications in the sub-scanning direction by changing the scanning speed of the carriage and being set as the predetermined scanning control conditions selected.

22. A method for controlling an image-processing device provided with scanning means including a carriage which relatively moves first and second reading means for reading monochrome signals and color signals in a same reading area in a main scanning direction of an image of a document and the image of the document to make the first and second reading means scan the image of the document in its sub-scanning direction at a predetermined speed, the first and second reading means having first and second line sensors respectively having a first light-receiving sensitivity, and a second light-receiving sensitivity different from the first light-receiving sensitivity, and a reading optical system which guides an optical image of a document to the first and second line sensors, the method comprising:

by the scanning means, relatively moving the first and second line sensors and the image of the document to make the first and second line sensors scan the image of the document in the sub-scanning direction based on predetermined scanning control conditions in accordance with 100%, 2n times of 100%, or 1/2n times of 100% (n being an integer) as a plurality of read magnifications preset as read magnifications by the first and second line sensor to the document, the predetermined scanning control conditions being set in accordance with said plurality of read magnifications preset so as to change magnifications of the image of the document in the sub-scanning direction by the first and second line sensors by changing the scanning speed of the carriage;

aligning every line color signals read by the second line sensor which is moved for scanning by the scanning means in the sub-scanning direction based on the predetermined scanning control conditions in accordance with 100%, 2n times of 100%, or 1/2n times of 100% (n being an integer) as said plurality of read magnifications preset as the read magnifications by the first and second line sensors, by means of a delay memory which delays the color signals by a predetermined number of lines;

selecting the predetermined scanning control conditions so as to change the scanning speed of the carriage of the scanning means in accordance with said plurality of read magnifications preset as the read magnifications by the first and second line sensors to the document;

setting the predetermined scanning control conditions for changing the scanning speed of the carriage of the scanning means to a first plurality of control conditions as first parameters including said plurality of read magnifications preset to the first line sensor and the scanning speed of the carriage in accordance with said plurality of read magnifications;

setting the predetermined scanning control conditions for changing the scanning speed of the carriage of the scanning means to a second plurality of control conditions as second parameters including said plurality of read magnifications preset to the second line sensor and the scanning speed of the carriage in accordance with the ratio of the light-receiving sensitivities of the first and second line sensors with said plurality of read magnifications, the alignment of the color signals every line and said first plurality of control conditions as standards; and at least when set to a read magnification other than said plurality of read magnifications preset, performing an operating process to compute image data having a corresponding read magnification other than said plurality of read magnifications preset to the sub-scanning direction in accordance with the monochrome and color signals read by the first and second line sensors at any one of said plurality of read magnifications preset based on: said first plurality of control conditions as the first parameters including said plurality of read magnifications preset to the first line sensor and the scanning speed of the carriage in accordance with said plurality of read magnifications; and said second plurality of control conditions as the second parameters including said plurality of read magnifications preset to the second line sensor and the scanning speed of the carriage in accordance with the ratio of the light-receiving sensitivities of the first and second line sensors with said plurality of read magnifications, the alignment of the color signals every line and said first plurality of control conditions as standards, said first plurality of control conditions and said second plurality of control conditions being set in accordance with said plurality of read magnifications preset so as to change the magnifications in the sub-scanning direction by changing the scanning speed of the carriage and being set as the predetermined scanning control conditions selected.

23. A method for controlling an image-processing device provided with scanning means including a carriage which relatively moves reading means for reading color signals and an image of a document in a main scanning direction of the image to make the reading means scan the image in its sub-scanning direction at a predetermined speed, the method comprising:

by the scanning means, relatively moving the reading means and the image of the document to make the reading means scan the image of the document in the sub-scanning direction based on predetermined scanning control conditions in accordance with 100%, 2n times of 100%, or 1/2n times of 100% (n being an integer) as a plurality of read magnifications preset as read magnifications by the reading means to the document, the predetermined scanning control conditions being set in accordance with said plurality of read magnifications preset so as to change magnifications of the image of the document in the sub-scanning direction by the reading means by changing the scanning speed of the carriage; aligning every line color signals read by the reading means which is moved for scanning by the scanning means in the sub-scanning direction based on the predetermined scanning control conditions in accordance with 100%, 2n times of 100%, or 1/2n times of 100% (n being an integer) as said plurality of read magnifications preset as the read magnifications by the reading means, by means of a delay memory which delays the color signals by a predetermined line;

selecting the predetermined scanning control conditions so as to change the scanning speed of the carriage of the scanning means in accordance with said plurality of read magnifications preset as the read magnifications by the reading means to the document;

setting the predetermined scanning control conditions for changing the scanning speed of the carriage of the scanning means to a plurality of control conditions as parameters including said plurality of read magnifications preset to the reading means and the scanning speed of the carriage in accordance with said plurality of read magnifications and the alignment of the color signals every line; and at least when set to a read magnification other than said plurality of read magnifications preset, performing an operating process to compute image data having a corresponding read magnification other than said plurality of read magnifications preset to the sub-scanning direction in accordance with the color signals read by the reading means at any one of said plurality of read magnifications preset based on said plurality of control conditions as the parameters including said plurality of read magnifications preset to the reading means and the scanning speed of the carriage in accordance with said plurality of read magnifications and the alignment of the color signals every line, said plurality of control conditions being set in accordance with said plurality of preset read magnifications so as to change the magnifications in the sub-scanning direction by changing the scanning speed of the carriage and being set as the predetermined scanning control conditions selected.

24. A method for controlling an image-processing device provided with scanning means including a carriage which relatively moves reading means for reading signals and an image of a document in a main scanning direction of the image to make the reading means scan the image in its sub-scanning direction at a predetermined speed, the method comprising:

selecting predetermined scanning control conditions for relatively moving the reading means and the image of the document to make the reading means scan the image of the document in the sub-scanning direction by the scanning means in accordance with said plurality of read magnifications preset as the read magnifications by the reading means to the document, the predetermined scanning control conditions being set in accordance with said plurality of read magnifications preset so as to change magnifications of the image of the document in the sub-scanning direction by the reading means by changing the scanning speed of the carriage;

setting the predetermined scanning control conditions for changing the scanning speed of the carriage of the scanning means to a plurality of control conditions as parameters including said plurality of read magnifications preset to the reading means and the scanning speed of the carriage in accordance with said plurality of read magnifications; and at least when set to a read magnification other than said plurality of read magnifications preset, performing an enlargement operating process to compute image data having a corresponding read magnification other than said plurality of read magnifications preset to the sub-scanning direction in accordance with the signals read by the reading means at any one of said plurality of read magnifications preset based on said plurality of control conditions as the parameters including said plurality of read magnifications preset to the reading means and the scanning speed of the carriage in accordance with said plurality of read magnifications, said plurality of control conditions being set in accordance with said plurality of read magnifications preset so as to change the magnifications in the sub-scanning direction by changing the scanning speed of the carriage and being set as the predetermined scanning control conditions selected;

at least when set to a read magnification other than said plurality of read magnifications preset, performing a reduction operating process to compute image data having a corresponding read magnification other than said plurality of read magnifications preset to the sub-scanning direction in accordance with the signals read by the reading means at any one of said plurality of read magnifications preset based on said plurality of control conditions as the parameters including said plurality of read magnifications preset to the reading means and the scanning speed of the carriage in accordance with said plurality of read magnifications, said plurality of control conditions being set in accordance with said plurality of read magnifications preset so as to change the magnifications in the sub-scanning direction by changing the scanning speed of the carriage, and set as the predetermined scanning control conditions selected; and adaptively changing the enlargement operating process and the reduction operating process in accordance with a corresponding read magnification other than said plurality of read magnifications preset.

* * * * *